United States Patent
Patidar et al.

(10) Patent No.: US 11,727,177 B2
(45) Date of Patent: *Aug. 15, 2023

(54) INTEGRATED CIRCUIT DESIGN METHOD, SYSTEM AND COMPUTER PROGRAM PRODUCT

(71) Applicants: TAIWAN SEMICONDUCTOR MANUFACTURING COMPANY, LTD., Hsinchu (TW); TSMC NANJING COMPANY, LIMITED, Nanjing (CN)

(72) Inventors: Ankita Patidar, Hsinchu (TW); Sandeep Kumar Goel, Hsinchu (TW); Yun-Han Lee, Hsinchu (TW)

(73) Assignees: TAIWAN SEMICONDUCTOR MANUFACTURING COMPANY, LTD., Hsinchu (TW); TSMC NANJING COMPANY, LIMITED, Nanjing (CN)

( * ) Notice: Subject to any disclaimer, the term of this patent is extended or adjusted under 35 U.S.C. 154(b) by 0 days.

This patent is subject to a terminal disclaimer.

(21) Appl. No.: 17/836,954

(22) Filed: Jun. 9, 2022

(65) Prior Publication Data
US 2022/0300689 A1    Sep. 22, 2022

Related U.S. Application Data

(63) Continuation of application No. 17/122,769, filed on Dec. 15, 2020, now Pat. No. 11,379,643.

(51) Int. Cl.
*G06F 30/327* (2020.01)
*G06F 30/398* (2020.01)
(Continued)

(52) U.S. Cl.
CPC .......... *G06F 30/327* (2020.01); *G06F 30/398* (2020.01); *G06F 30/333* (2020.01);
(Continued)

(58) Field of Classification Search
CPC .. G06F 30/327; G06F 30/398; G06F 30/3308; G06F 30/333; G06F 2119/18; G06F 2119/02
(Continued)

(56) References Cited

U.S. PATENT DOCUMENTS

| 4,621,201 A | 11/1986 | Amdahl et al. |
| 5,812,561 A | 9/1998 | Giles et al. |

(Continued)

FOREIGN PATENT DOCUMENTS

KR    2018111126    10/2018

*Primary Examiner* — Phallaka Kik
(74) *Attorney, Agent, or Firm* — Hauptman Ham, LLP

(57) ABSTRACT

A method executed at least partially by a processor includes creating a plurality of groups of paths from a plurality of paths in an integrated circuit (IC) layout diagram. Each group among the plurality of groups has a unique dominant feature among a plurality of features of the plurality of paths. The dominant feature of a group among the plurality of groups is slack. The method further includes testing at least one path in a group among the plurality of groups. The method also includes, in response to the testing indicating that the at least one path fails, modifying at least one of the IC layout diagram, at least a portion of at least one library having cells included in the IC layout diagram, or a manufacturing process for manufacturing an IC corresponding to the IC layout diagram.

20 Claims, 14 Drawing Sheets

(51) Int. Cl.
  *G06F 30/333*     (2020.01)
  *G06F 30/3308*    (2020.01)
  *G06F 119/18*     (2020.01)
  *G06F 119/02*     (2020.01)

(52) U.S. Cl.
  CPC ...... *G06F 30/3308* (2020.01); *G06F 2119/02* (2020.01); *G06F 2119/18* (2020.01)

(58) Field of Classification Search
  USPC .............................. 716/136, 105, 112; 703/16
  See application file for complete search history.

(56) References Cited

U.S. PATENT DOCUMENTS

| | | | |
|---|---|---|---|
| 6,223,097 B1 | 4/2001 | Hashimoto et al. | |
| 6,519,749 B1 | 2/2003 | Chao et al. | |
| 6,779,162 B2* | 8/2004 | Barrick | G06F 30/3312 |
| | | | 716/108 |
| 7,260,442 B2 | 8/2007 | Hwang et al. | |
| 9,256,709 B2 | 2/2016 | Yu et al. | |
| 9,939,880 B1 | 4/2018 | Foreman et al. | |
| 10,592,625 B1 | 3/2020 | Tang et al. | |
| 10,846,453 B1* | 11/2020 | Castle | G06N 20/00 |
| 11,361,248 B2* | 6/2022 | Huang | G01R 31/3177 |
| 11,372,551 B2* | 6/2022 | Choi | G11C 16/0483 |
| 11,379,643 B2* | 7/2022 | Patidar | G06F 30/398 |
| 2003/0131328 A1 | 7/2003 | Barrick et al. | |
| 2004/0250230 A1 | 12/2004 | Itou et al. | |
| 2006/0242502 A1 | 10/2006 | Wang et al. | |
| 2007/0011542 A1 | 1/2007 | Mukherjee et al. | |
| 2009/0031269 A1 | 1/2009 | Chen et al. | |
| 2009/0240458 A1 | 9/2009 | Desineni et al. | |
| 2009/0276191 A1 | 11/2009 | Bell, Jr. et al. | |
| 2010/0242011 A1 | 9/2010 | Mukai et al. | |
| 2011/0121838 A1 | 5/2011 | Gillis et al. | |
| 2012/0047412 A1 | 2/2012 | Chung | |
| 2012/0047413 A1 | 2/2012 | Chung | |
| 2014/0040838 A1 | 2/2014 | Liu et al. | |
| 2015/0278429 A1 | 10/2015 | Chang | |
| 2017/0371983 A1 | 12/2017 | Franch et al. | |
| 2019/0087388 A1 | 3/2019 | Venturelli et al. | |
| 2019/0220776 A1 | 7/2019 | Huang et al. | |
| 2020/0401668 A1* | 12/2020 | Lu | G06F 30/398 |
| 2021/0034251 A1 | 2/2021 | Choi et al. | |
| 2022/0067250 A1* | 3/2022 | Chakrabarty | G06F 30/3312 |
| 2022/0215146 A1* | 7/2022 | Lin | G06F 30/27 |

\* cited by examiner

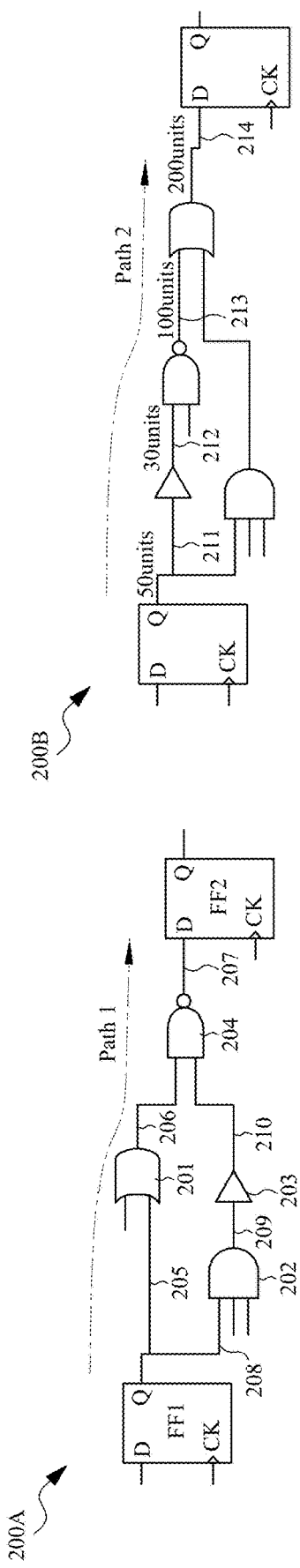
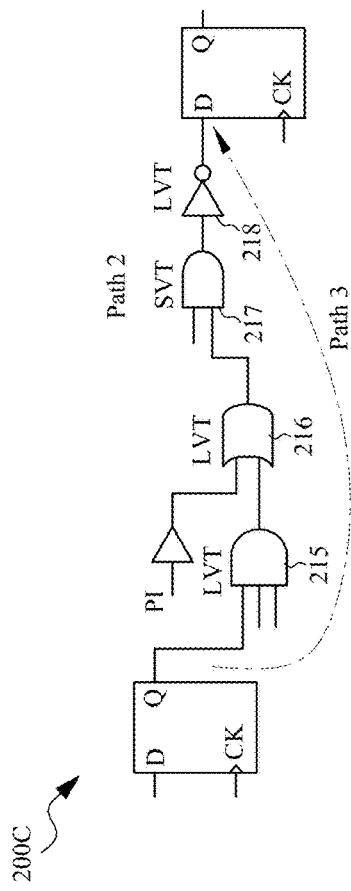
Fig. 2A
Fig. 2B
Fig. 2C

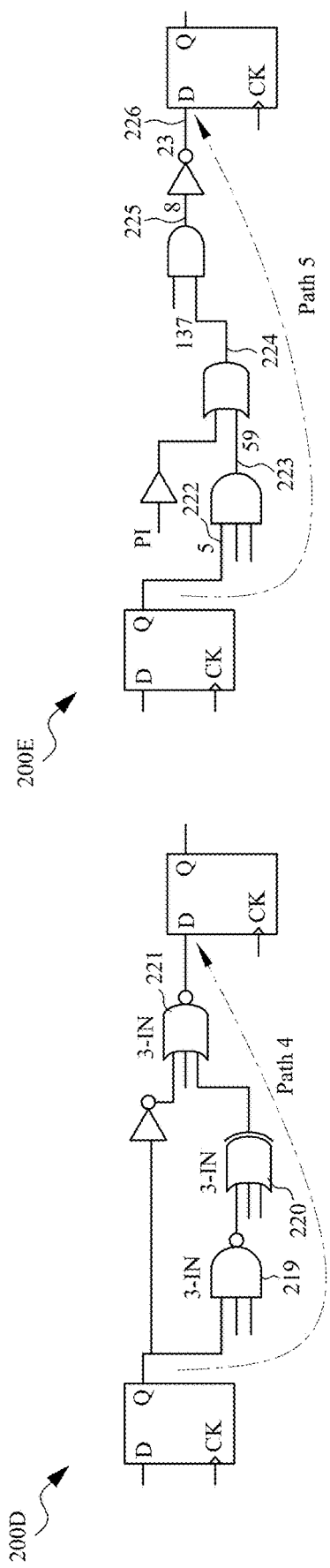
Fig. 2D
Fig. 2E
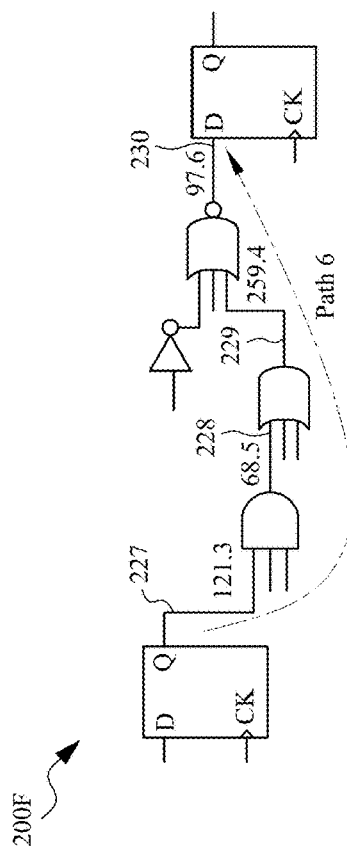
Fig. 2F

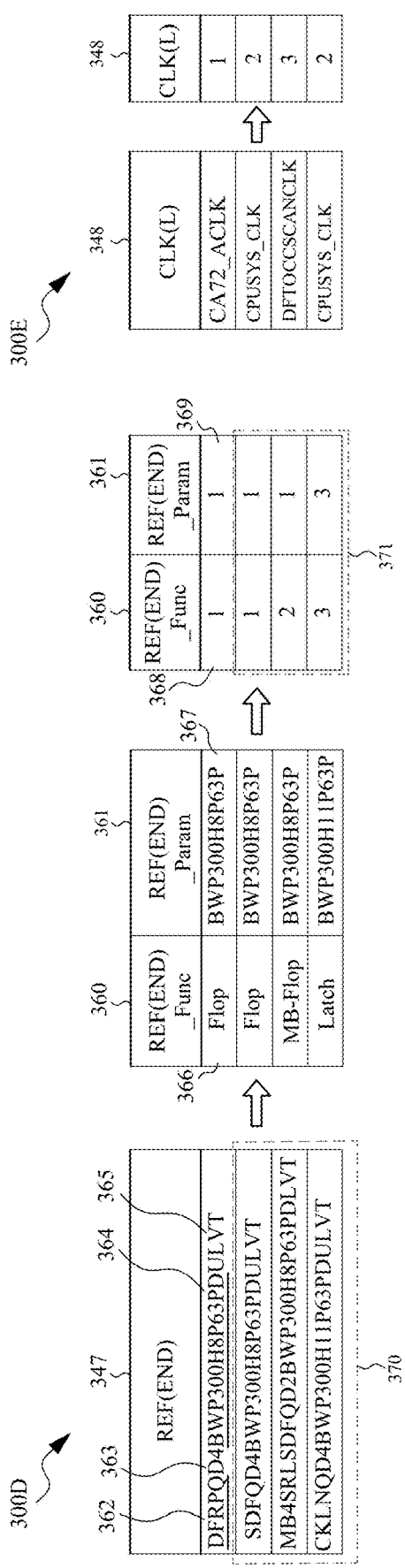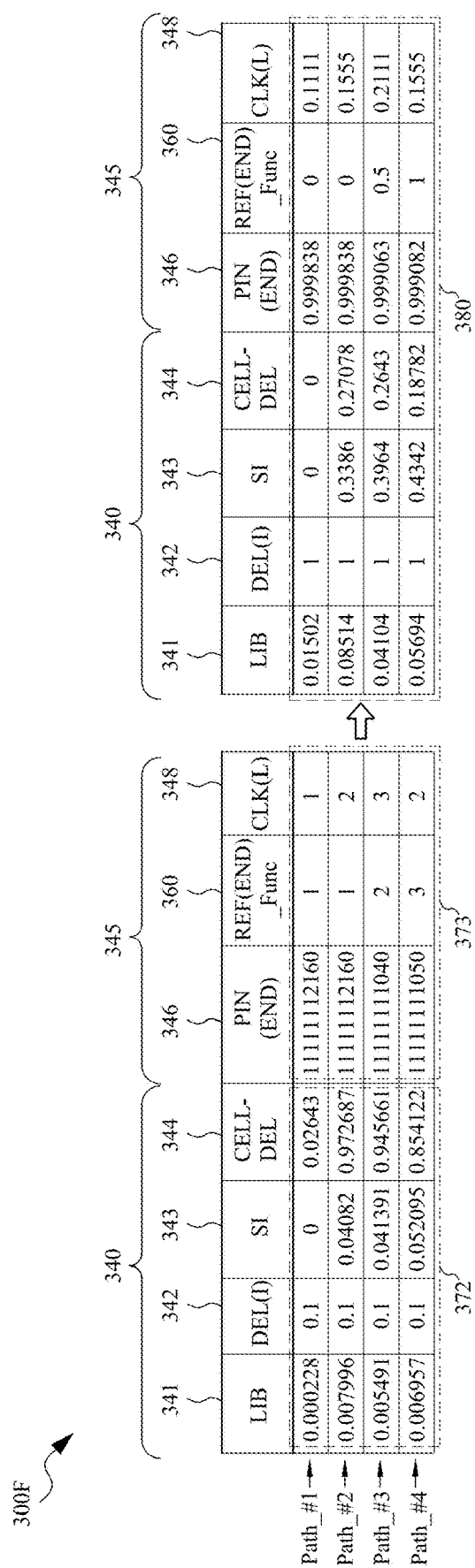

| Feature | Correlation |
|---|---|
| ff | 0.247651 |
| lr | 0.247651 |
| ss | 0.215416 |
| LOGIC_DEPTH | 0.207033 |
| Per_cell_del | 0.201033 |
| LIB | 0.178544 |
| REF(END) Param | 0.101012 |
| CLK(C) | 0.138712 |
| CELL_DEL(w/o BUFF/INV) | 0.089735 |
| M11 | 0.065343 |
| WORST_CELL_SLEW_RATIO | 0.064469 |
| ViaCount | 0.020206 |
| WORST_NET_SLEW_RATIO | 0.007747 |
| Xmin | -0.035044 |
| Ymin | -0.053047 |
| INV_cells | -0.070155 |
| FANOUT(WORST_NET) | 0.154071 |
| AQCap(C) | 0.057630 |
| RNR | -0.522506 |
| AT(C) | -0.564351 |

INTEGRATED CIRCUIT DESIGN METHOD, SYSTEM AND COMPUTER PROGRAM PRODUCT

RELATED APPLICATION(S)

The present application is a continuation application of U.S. patent application Ser. No. 17/122,769, filed Dec. 15, 2020, now U.S. Pat. No. 11,379,643 B2, which is incorporated herein by reference in its entirety.

BACKGROUND

An integrated circuit (IC) typically includes a number of semiconductor devices represented in an IC layout diagram. An IC layout diagram is hierarchical and includes modules which carry out higher-level functions in accordance with the semiconductor device's design specifications. The modules are often built from a combination of cells, each of which represents one or more semiconductor structures configured to perform a specific function. Cells having pre-designed layout diagrams, sometimes known as standard cells, are stored in standard cell libraries (hereinafter "libraries" or "cell libraries" for simplicity) and accessible by various tools, such as electronic design automation (EDA) tools, to generate, optimize and verify designs for ICs. At various steps during the IC design process, various checking and testing are performed to make sure that ICs can be made and will function as designed.

BRIEF DESCRIPTION OF THE DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

FIGS. 2A-2F are schematic logic diagrams of various sections of an IC layout diagram with example paths, in accordance with some embodiments.

FIG. 3D is a schematic view of a table including an example feature with corresponding values in several example paths in a second encoding operation, in accordance with some embodiments.

FIG. 3E is a schematic view of a table including an example feature with corresponding values in several example paths in a third encoding operation, in accordance with some embodiments.

FIG. 3F is a schematic view of a table including various numerical features and categorical features with corresponding values in several example paths in a normalization operation, in accordance with some embodiments.

FIG. 3G is a schematic view of a table including various features with corresponding correlation coefficients in a second feature reduction operation, in accordance with some embodiments.

DETAILED DESCRIPTION

Figure 1:
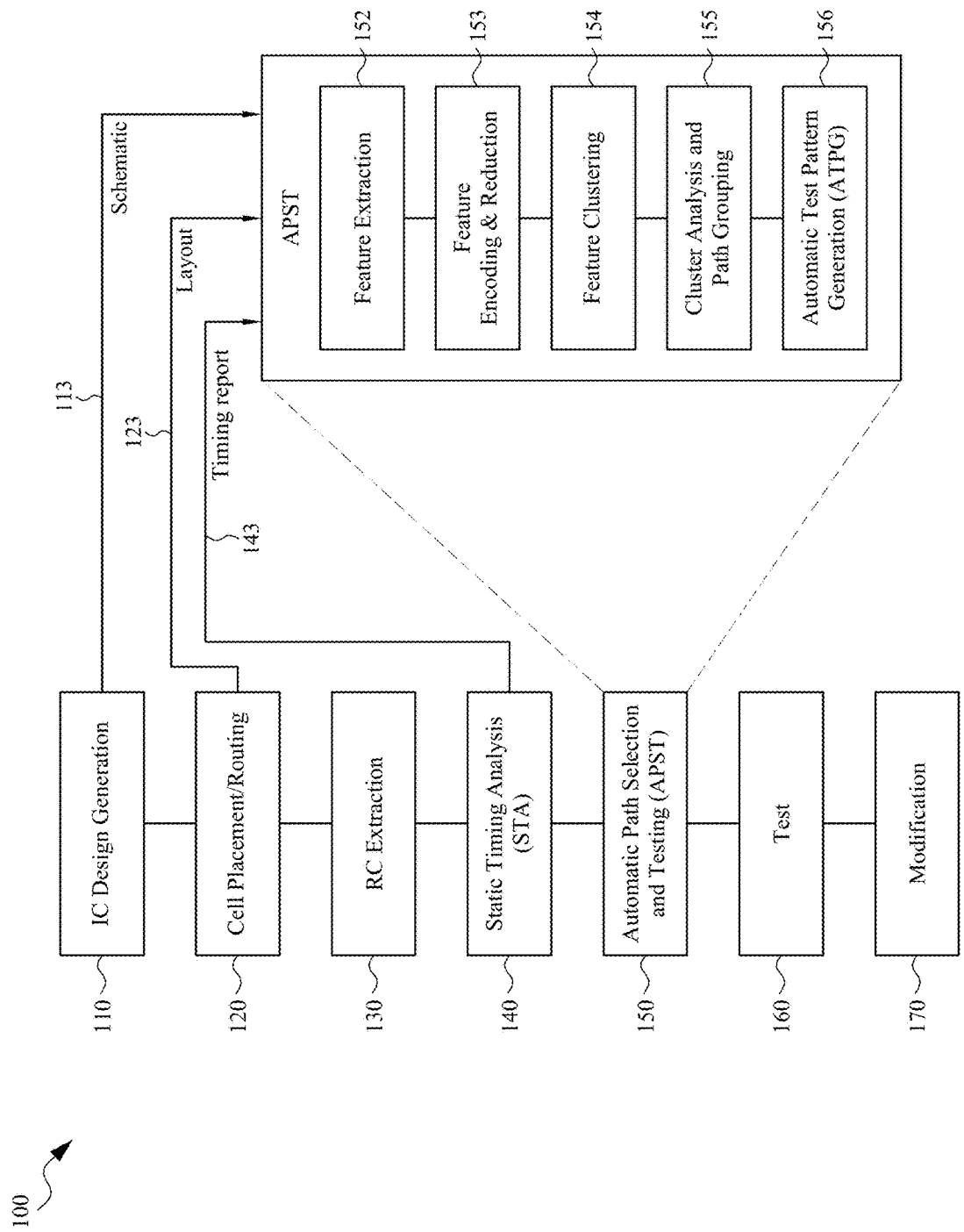
FIG. 1 is a functional flow chart of at least a portion of an IC design flow, in accordance with some embodiments.

The following disclosure provides many different embodiments, or examples, for implementing different features of the provided subject matter. Specific examples of components, materials, values, steps, operations, materials, arrangements, or the like, are described below to simplify the present disclosure. These are, of course, merely examples and are not intended to be limiting. Other components, values, operations, materials, arrangements, or the like, are contemplated. For example, the formation of a first feature over or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

Further, spatially relative terms, such as "beneath," "below," "lower," "above," "upper" and the like, may be used herein for ease of description to describe one element or feature's relationship to another element(s) or feature(s) as illustrated in the figures. The spatially relative terms are intended to encompass different orientations of the device in use or operation in addition to the orientation depicted in the figures. The apparatus may be otherwise oriented (rotated 90 degrees or at other orientations) and the spatially relative descriptors used herein may likewise be interpreted accordingly.

In an IC design process, one or more pre-manufacturing or post-manufacturing verifications are performed for identifying a potential fault in an IC layout diagram or in an IC (chip) manufactured in accordance with the IC layout diagram. In some embodiments, a plurality of paths in an IC layout diagram is grouped into a plurality of groups. The paths in each group share a common dominant feature, such as a timing feature, a logical feature, or a physical feature. A test is performed for at least one path in each group. When a path fails the test, the dominant feature associated with the corresponding group is identified as related to a systematic defect. Based on the dominant feature identified as related to a systematic defect, a correction for fixing the failing path is made to at least one of the IC layout diagram, a library having cells included in the IC layout diagram, or a manufacturing process. As a result, in at least one embodiment, it is possible to fix or improve multiple paths sharing the same dominant feature by a common correction strategy. In one or more embodiments, by grouping paths by dominant features for testing, it is possible to identify and correct various systematic defects which are not identified in other approaches.

FIG. 1 is a functional flow chart of at least a portion of an IC design flow 100 in accordance with some embodiments. The IC design flow 100 utilizes one or more electronic design automation (EDA) tools for generating, optimizing and/or verifying a design of an IC before and/or after manufacturing the IC. The EDA tools, in some embodiments, are one or more sets of executable instructions for execution by a processor or controller or a programmed computer (e.g., system 600 (FIG. 6)) to perform the indicated functionality. In at least one embodiment, the IC design flow 100 is performed by a design house of an IC manufacturing system discussed herein with respect to FIG. 7.

At IC design generation operation 110, a design of an IC is provided by a circuit designer. In some embodiments, the design of the IC comprises an IC schematic, i.e., an electrical diagram, of the IC. In some embodiments, the schematic is generated or provided in the form of a schematic netlist, such as a Simulation Program with Integrated Circuit Emphasis (SPICE) netlist. Other data formats, e.g., Verilog, for describing the design are usable in some embodiments. In some embodiments, a pre-layout simulation is performed on the design to determine whether the design meets a predetermined specification. When the design does not meet the predetermined specification, the IC is redesigned. In at least one embodiment, a pre-layout simulation is omitted.

At cell placement and routing operation 120, a layout diagram of the IC is generated based on the IC schematic. The cell placement and routing operation 120 is referred to as Automatic Placement and Routing (APR) in at least one embodiment. The IC layout diagram comprises physical positions of various circuit elements of the IC as well as physical positions of various nets interconnecting the circuit elements. For example, the IC layout diagram is generated in the form of a Graphic Design System (GDS) file. Other data formats, e.g., Design Exchange Format (DEF), for describing the design of the IC are within the scope of various embodiments. In at least one embodiment, the IC layout diagram is generated by an EDA tool, such as an APR tool. The APR tool receives the design of the IC in the form of a netlist as described herein. The APR tool performs floor planning to identify circuit elements, which are to be electrically connected to each other and which are to be placed in close proximity to each other, for reducing the area of the IC and/or reducing time delays of signals travelling over the interconnections or nets connecting the electrically connected circuit elements. In some embodiments, the APR tool performs partitioning to divide the design of the IC into a plurality of blocks or groups, such as clock and logic groups. Example operations by the APR tool include, but are not limited to, a cell placement operation and a routing operation.

In a cell placement operation, the APR tool performs cell placement. Cells configured to provide pre-defined functions and having pre-designed layout diagrams are stored in one or more cell libraries, for example, in Library Exchange Format (LEF). LEF is a specification that includes design rules and information about cells in a library. In at least one embodiment, LEF is used with DEF to represent a physical layout of an IC being designed. The APR tool accesses various cells from one or more cell libraries, and places the cells in an abutting manner to generate an IC layout diagram corresponding to the IC schematic. Each cell includes one or more circuit elements and/or one or more nets. A circuit element is an active element or a passive element. Examples of active elements include, but are not limited to, transistors and diodes. Examples of transistors include, but are not limited to, metal oxide semiconductor field effect transistors (MOSFET), complementary metal oxide semiconductor (CMOS) transistors, bipolar junction transistors (BJT), high voltage transistors, high frequency transistors, p-channel and/or n-channel field effect transistors (PFETs/NFETs) or the like, FinFETs, planar MOS transistors with raised source/drains, or the like. Examples of passive elements include, but are not limited to, capacitors, inductors, fuses, and resistors. Examples of nets include, but are not limited to, vias, conductive pads, conductive traces, and conductive redistribution layers, or the like.

In a routing operation, the APR tool performs routing to route various nets interconnecting the placed circuit elements. The routing is performed to ensure that the routed interconnections or nets satisfy a set of constraints. For example, the routing operation includes global routing, track assignment and detailed routing. During the global routing, routing resources used for interconnections or nets are allocated. For example, the routing area is divided into a number of sub-areas, pins (or terminals) of the placed circuit elements are mapped to the sub-areas, and nets are constructed as sets of sub-areas in which interconnections are physically routable. During the track assignment, the APR tool assigns interconnections or nets to corresponding conductive layers of the IC layout diagram. During the detailed routing, the APR tool routes interconnections or nets in the assigned conductive layers and within the global routing resources. For example, detailed, physical interconnections are generated within the corresponding sets of sub-areas defined at the global routing and in the conductive layers defined at the track assignment. After the routing operation, the APR tool outputs the IC layout diagram including the placed circuit elements and routed nets. The described APR tool is an example. Other arrangements are within the scope of various embodiments. For example, in one or more embodiments, one or more of the described operations are omitted or one or more additional operations are added before, during, or after the described operations.

In some embodiments, one or more verifications are performed after the cell placement and routing operation 120. Example verifications include, but are not limited to, a layout-versus-schematic (LVS) check, and a design rule check (DRC). Other verification processes are usable in other embodiments.

An LVS check is performed to ensure that the generated IC layout diagram corresponds to the design of the IC. Specifically, an LVS checking tool, i.e., an EDA tool, recognizes electrical components as well as connections therebetween from the patterns of the generated IC layout diagram. The LVS checking tool then generates a layout netlist representing the recognized electrical components and connections. The layout netlist generated from the IC layout diagram is compared, by the LVS checking tool, with the schematic netlist of the design of the IC. If the two netlists match within a matching tolerance, the LVS check is passed. Otherwise, correction is made to at least one of the IC layout diagram or the design of the IC by returning the process to at least one of the IC design generation operation 110 or the cell placement and routing operation 120.

A DRC is performed, e.g., by an EDA tool, to ensure that the IC layout diagram satisfies certain manufacturing design rules, i.e., to ensure manufacturability of the IC. If one or more design rules is/are violated, correction is made to at least one of the IC layout diagram or the design of the IC by returning the process to at least one of the IC design generation operation 110 or the cell placement and routing operation 120. Examples of design rules include, but are not limited to, a width rule which specifies a minimum width of a pattern in the IC layout diagram, a spacing rule which specifies a minimum spacing between adjacent patterns in the IC layout diagram, an area rule which specifies a minimum area of a pattern in the IC layout diagram, etc.

At resistance and capacitance (RC) extraction operation 130, an RC extraction is performed, e.g., by an EDA tool, to determine parasitic parameters, e.g., parasitic resistance and parasitic capacitance, of components in the IC layout diagram for timing simulations in one or more subsequent operations.

At static timing analysis (STA) operation 140, an EDA tool estimates delays in a plurality of paths in the IC layout diagram. Input data for the STA operation 140 include, but are not limited to, the IC layout diagram, the parasitic parameters extracted by the RC extraction operation 130, cell delays obtained from one or more cell libraries having cells included in the IC layout diagram. Output data from the STA operation 140 are included in a timing report described herein. In at least one embodiment, the STA operation 140 is performed without a simulation of operation of an IC corresponding to the IC layout diagram. In at least one embodiment, when the delays estimated in the STA operation 140 for one or more paths fail to meet corresponding timing requirements, correction is made to at least one of the IC layout diagram or the design of the IC by returning the process to at least one of the IC design generation operation 110 or the cell placement and routing operation 120.

At Automatic Path Selection and Testing (APST) operation 150, the paths in the IC layout diagram are grouped and test patterns are generated for the grouped paths. In some embodiments, the APST operation 150 is performed at least partially by an EDA tool. An exploded schematic view showing further operations of the APST operation 150 in accordance with some embodiments is also illustrated in FIG. 1. Input data for the APST operation 150 include one or more of the IC schematic 113 output from the IC design generation operation 110, the IC layout diagram 123 output from the cell placement and routing operation 120, and the timing report 143 from the STA operation 140. In the example configuration in FIG. 1, the APST operation 150 comprises a feature extraction operation 152, a feature encoding and reduction operation 153, a feature clustering operation 154, a cluster analysis and path grouping operation 155, and an Automatic Test Pattern Generation (ATPG) operation 156.

At the feature extraction operation 152, a plurality of features of the paths in the IC layout diagram is extracted, as described with respect to FIGS. 2A-2G.

At the feature encoding and reduction operation 153, the extracted features are encoded and reduced to obtain a reduced set of features, as described with respect to FIGS. 3A-3G.

Figure 4:
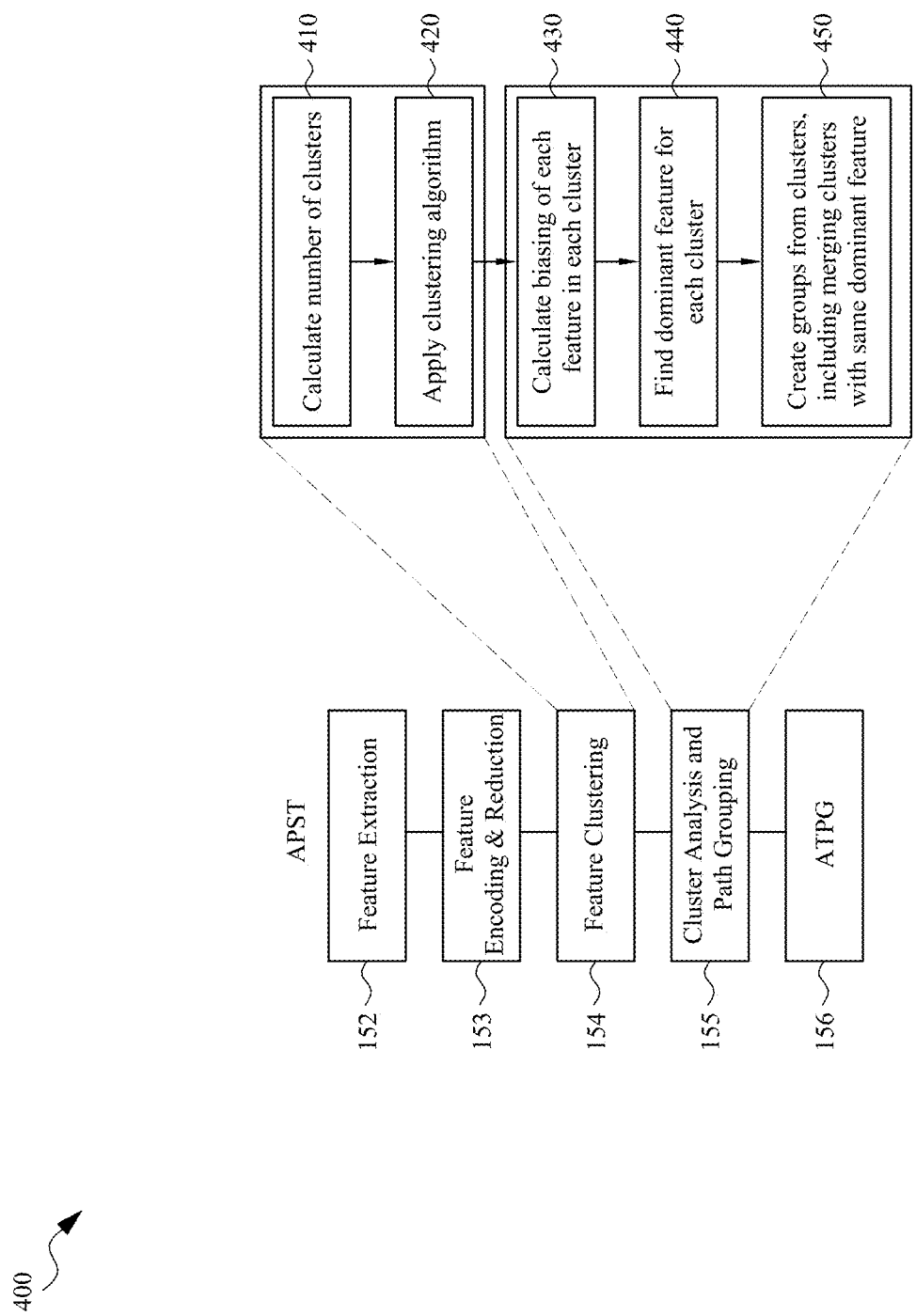
FIG. 4 is a flow chart of a process in feature clustering and path grouping operations, in accordance with some embodiments.

At the feature clustering operation 154, the paths of the IC layout diagram are divided into a plurality of clusters, as described with respect to FIG. 4.

At the cluster analysis and path grouping operation 155, the clusters are analyzed and grouped into a plurality of groups with associated unique dominant features, as described with respect to FIG. 4.

At the ATPG operation 156, one or more ATPG methods or algorithms are used to generate test patterns for one or more paths in each group, as described herein.

At testing operation 160, a test is performed for one or more paths in each group, using the test patterns generated by the ATPG operation 156 to determine whether the IC layout diagram or an actual IC manufactured in accordance with the IC layout diagram meets a predetermined specification of one or more timing requirements. In at least one embodiment, the test comprises a post-layout simulation, e.g., performed by an EDA tool, to simulate an operation of an IC corresponding to the IC layout diagram. In some embodiments, the test is performed by Automatic Test Equipment (ATE) having hardware structures, such as probes, to electrically couple to an actual IC (chip) fabricated in accordance with the IC layout diagram, for testing operation of the actual IC. In one or more embodiments, the test at the testing operation 160 comprises both a post-layout simulation by an EDA tool and a test performed by ATE on an actual IC. When the IC layout diagram and/or an actual IC fabricated based on the IC layout diagram pass the test, additional verification processes are performed, or ICs are fabricated based on the IC layout diagram.

At modification operation 170, correction is made when the IC layout diagram and/or an actual IC fabricated based on the IC layout diagram fail the test at the testing operation 160. In some embodiments, correction is made to at least one of the IC layout diagram or the design of the IC by returning the process to at least one of the IC design generation operation 110 or the cell placement and routing operation 120. The correction to the design of the IC at the IC design generation operation 110 results in corresponding correction to the IC layout diagram at the cell placement and routing operation 120. In some embodiments, correction is made to one or more cell libraries having cells included in the IC layout diagram. The correction to the one or more cell libraries results in corresponding correction to the IC layout diagram at the cell placement and routing operation 120. In some embodiments, correction is made to a manufacturing process for manufacturing an IC corresponding to the IC layout diagram. The IC design flow 100 in FIG. 1 is an example. In some embodiments, the IC design flow 100 includes one or more further operations, and/or one or more of the described operations are omitted.

FIGS. 2A-2F are schematic logic diagrams of various sections of an IC layout diagram with example paths, in accordance with some embodiments. FIG. 2G is a schematic view showing various extracted features of paths in an IC layout diagram, in accordance with some embodiments.

FIG. 2A is a schematic logic diagrams of a section 200A of an IC layout diagram, with path 1 in accordance with some embodiments. The section 200A comprises a plurality of logic gates 201-204, and a plurality of nets (or wires) 205-210 which couple logic gates 201-204 with each other and with two flip-flops FF1, FF2. For simplicity, each logic gate is assumed to be a cell. Path 1 comprises net 205, cell 201, net 206, cell 204 and net 207 coupled serially between flip-flops FF1, FF2. In at least one embodiment, path 1 is identified in the timing report 143 output from the STA operation 140. Features of path 1 include features of nets 205, 206, 207 and features of cells 201, 204 in path 1.

Example features of a net include, but are not limited to, "physical net length in metal layer," "total physical net length," "number of vias in wire (or net)," "net delay," "slew-ratio," "layout shape," or the like. The feature "physical net length in metal layer" indicates a physical length of a section of the net arranged in a metal layer, such as M0, M1, M2 or the like. The feature "total physical net length" indicates a total physical length of the net in all metal layers in which the net is arranged. The feature "number of vias in wire (or net)" indicates a number of vias that couple different segments of the net in different metal layers together. The feature "net delay" indicates a time delay of a signal travelling through the net due to the parasitic capacitance and parasitic resistance of the net. The feature "slew-ratio" indicates how fast or slow a leading edge or a trailing edge of a signal rises or falls. The feature "layout shape" indicates a shape of the net. Example shapes of a net include, but are not limited to, L-shape, I-shape, T-shape, or the like. Other features of a net are within the scopes of various embodiments.

Example features of a cell include, but are not limited to, "driving strength," "VT type," "number of inputs," "number of outputs," "function type," "number of transistors," "height," "pitch," "layout shape," "sensitivity delay" or the like. The feature "driving strength" indicates a designed load of the cell. The feature "VT type" indicates a type of threshold voltage (VT) at which transistors in the cell are turned ON or OFF. Example VT types include, but are not limited to, high threshold voltage (HVT), low threshold voltage (LVT), ultralow threshold voltage (ULVT), standard threshold voltage (SVT). Generally, cells with lower threshold voltages are faster but consume more power than cells with higher threshold voltages. The feature "number of inputs" indicates the number of inputs of the cell. The feature "number of outputs" indicates the number of outputs of the cell. The feature "function type" indicates a logic type of the cell. Example logic types include, but are not limited to, AOI (AND-OR-Invert), AND, XOR, OR, NAND, NOR, INV (Invert) or the like. The feature "number of transistors" indicates the number of transistors in the cell. The feature "height" indicates a height of the cell in a direction along gate regions of transistors in the cell. The feature "pitch" indicates a pitch between adjacent gate regions. The feature "layout shape" indicates a shape of a net inside the cell. The feature "sensitivity delay" indicates a time delay of a signal travelling through the cell. Other features of a cell are within the scopes of various embodiments. Further example features of paths are described with respect to FIG. 2G.

Figure 2G:
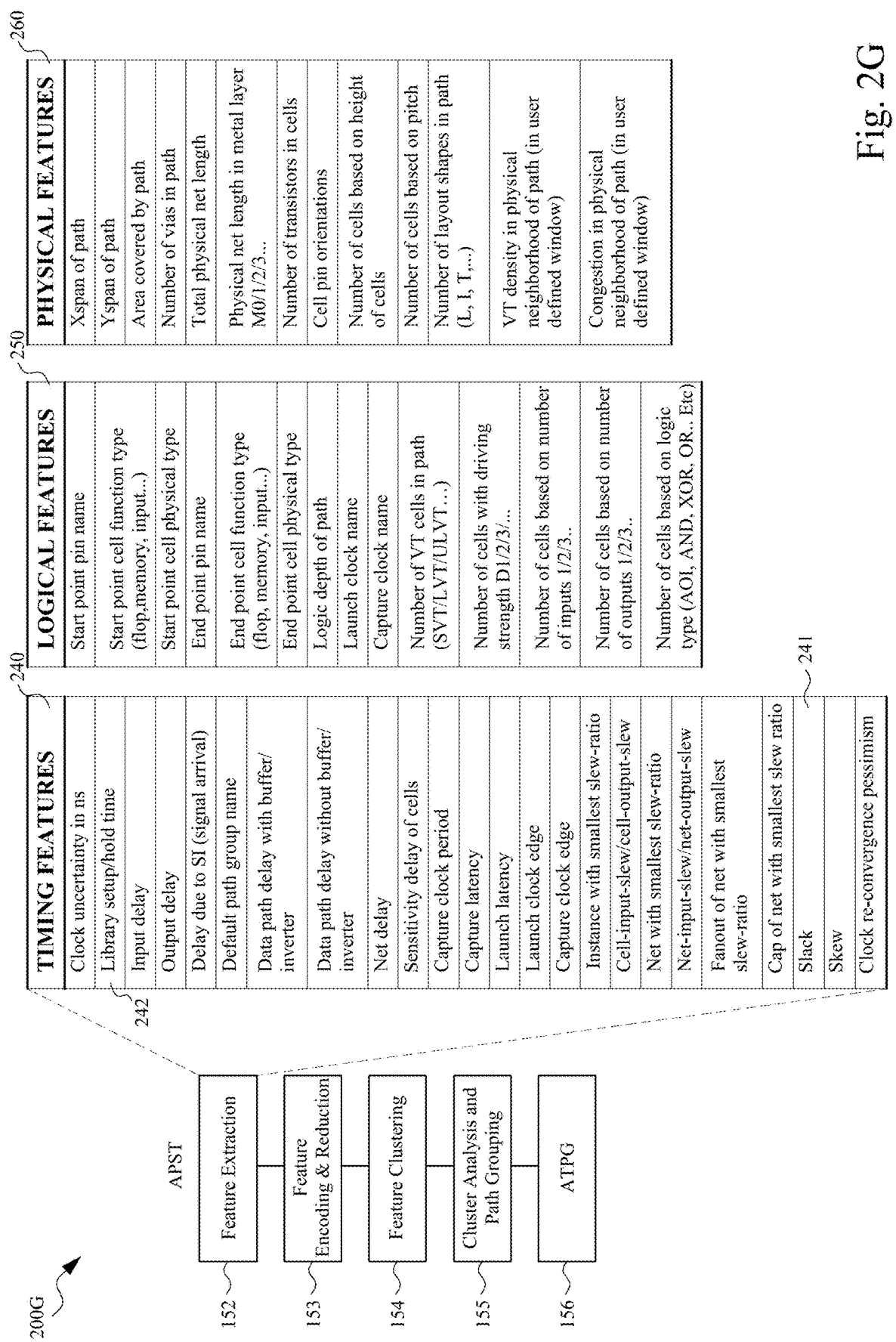
FIG. 2G is a schematic view of various extracted features of paths in an IC layout diagram, in accordance with some embodiments.

FIG. 2B is a schematic logic diagrams of a section 200B of an IC layout diagram, with path 2 in accordance with some embodiments. In the example configuration in FIG. 2B, nets 211-214 along path 2 have physical net lengths in metal layer M3 being 50 units, 30 units, 100 units and 200 units, respectively. The physical net lengths of nets 211-214 in metal layer M3 are greater than in other metal layers. In other words, nets 211-214 along path 2 are dominantly arranged in metal layer M3, or path 2 is dominated by nets in metal layer M3. Because nets 211-214 are dominantly arranged in metal layer M3, path 2 will be affected more by a variation in metal layer M3 compared to other paths not dominated by metal layer M3. When there is a variation in metal layer M3, small delays along nets 211-214 in path 2 will accumulate into a larger, easier to detect delay. In some embodiments as described herein, by grouping paths based on a dominant feature, such as metal layer M3 for path 2 or another feature described with respect to FIGS. 2C-2G, and testing the grouped paths, it is possible to identify and fix small delay defects (SDDs).

FIG. 2C is a schematic logic diagrams of a section 200C of an IC layout diagram, with path 3 in accordance with some embodiments. In the example configuration in FIG. 2C, cells 215-218 are arranged along path 3. Cells 215, 216, 218 are configured from transistors having a low threshold voltage (LVT), and cell 217 is configured from transistors having a standard threshold voltage (SVT). In other words, the cells along path 3 are dominantly configured as LVT cells, or path 3 is dominated by LVT cells.

FIG. 2D is a schematic logic diagrams of a section 200D of an IC layout diagram, with path 4 in accordance with some embodiments. In the example configuration in FIG. 2D, cells 219-221 are arranged along path 4. Each of cells 219-221 is configured to have three inputs. In other words, the cells along path 4 are dominantly configured as 3-input cells, or path 4 is dominated by 3-input cells.

FIG. 2E is a schematic logic diagrams of a section 200E of an IC layout diagram, with path 5 in accordance with some embodiments. In the example configuration in FIG. 2E, nets 222-226 are arranged along path 5. The numbers of vias in nets 222-226 are 5, 59, 137, 8, and 23, respectively. The total number of vias in the nets of path 5 is greater than an average total number of vias in the plurality of paths of the IC layout diagram. In other words, path 5 is dominated by the number of vias in the path.

FIG. 2F is a schematic logic diagrams of a section 200F of an IC layout diagram, with path 6 in accordance with some embodiments. In the example configuration in FIG. 2F, nets 227-230 arranged along path 6 have physical net lengths in metal layer M5 being 121.3, 68.5, 259.4 and 97.6, respectively. The total physical net lengths of the nets of path 6 in metal layer M5 is greater than other paths. In other words, path 6 is dominated by the physical net length in metal layer M5.

FIG. 2G is a schematic view of a feature list 200G showing various extracted features of paths in an IC layout diagram, in accordance with some embodiments. The feature list 200G is an example of a result of the feature extraction operation 152. The feature list 200G comprises one or more of timing features 240, logical features 250, and physical features 260. The feature list 200G is not exhaustive, and other features are within the scopes of various embodiments.

One or more of the timing features 240 are obtained as a result of the STA operation 140, included in the timing report 143 supplied to the APST operation 150, and then extracted from the timing report 143 by the feature extraction operation 152. An example feature is slack 241. Slack of a path is an amount of delay tolerable in a path before a timing constraint is violated. A negative value of slack indicates that the path already violates the timing constraint. A zero value of slack indicates that an IC corresponding to the IC layout diagram is operable, but no timing margin is available. A positive value of slack indicates that the IC is operable with a timing margin. An IC design flow attempts to achieve positive, or at least non-negative, values of slack in all paths.

One or more of the timing features 240 are obtained from a library. An example is library setup/hold time 242. The library setup/hold time 242 is a predetermined or known timing parameter of a cell and is retrieved from a library corresponding to the cell. In at least one embodiment, the library setup/hold time 242 is extracted from the library in the feature extraction operation 152. In one or more embodiments, the library setup/hold time 242 is included, at the STA operation 140, into the timing report 143, and then sent to the APST operation 150 for extraction in the feature extraction operation 152.

One or more of the logical features 250 are extracted from the IC schematic 113, e.g., a Verilog netlist.

One or more of the physical features 260 are extracted from the IC layout diagram 123, e.g., from one or more DEF and/or LEF files containing the IC layout diagram 123.

Figure 3A:
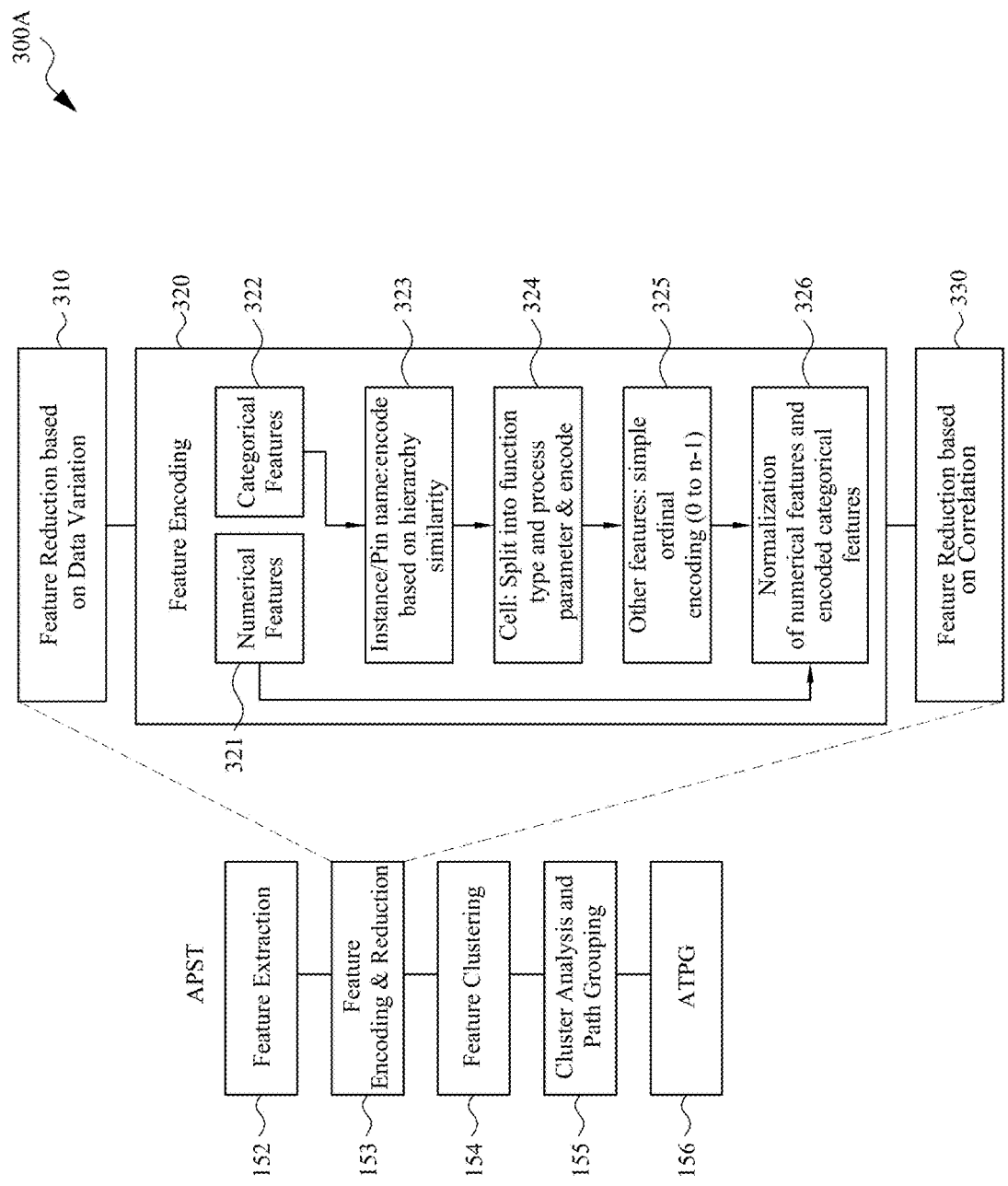
FIG. 3A is a flow chart of a process in a feature encoding and reduction operation, in accordance with some embodiments.

FIG. 3A is a flow chart of a process 300A in the feature encoding and reduction operation 153, in accordance with some embodiments. The process 300A comprises a first feature reduction operation 310, a feature encoding operation 320, and a second feature reduction operation 330.

At the first feature reduction operation 310, one or more features among the plurality of features extracted by the feature extraction operation 152 are removed based on data variation of the features across the plurality of paths of the IC layout diagram. The first feature reduction operation 310 is described herein with respect to FIG. 3B. In at least one embodiment, the first feature reduction operation 310 is omitted.

At the beginning of the feature encoding operation 320, the features remaining after the first feature reduction operation 310 are divided into numerical features 321 and categorical features 322. A numerical feature is a feature having numerical values. A categorical feature is a feature having non-numerical values. Example non-numerical values include, but are not limited to, strings of characters. Example of numerical features and categorical features are described herein in with respect to FIG. 3C. Because numerical values of the numerical features 321 are ready for further calculations, the numerical features 321 are not subjected to one or more of first-third encoding operations 323-325. To the contrary, non-numerical values of the categorical features 322 are not ready for further calculations, and are converted or encoded to obtain corresponding converted numerical values in one or more of the first through third encoding operations 323-325 in the feature encoding operation 320.

Figure 3B:
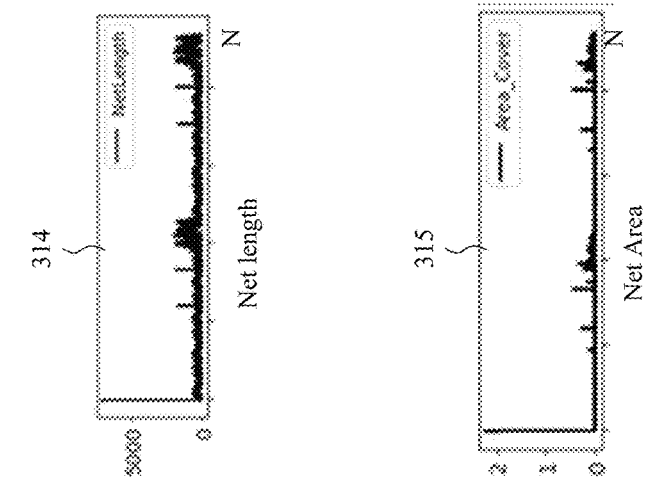
FIG. 3B is a schematic data representation of example features in a first feature reduction operation, in accordance with some embodiments.
Figure 3B:
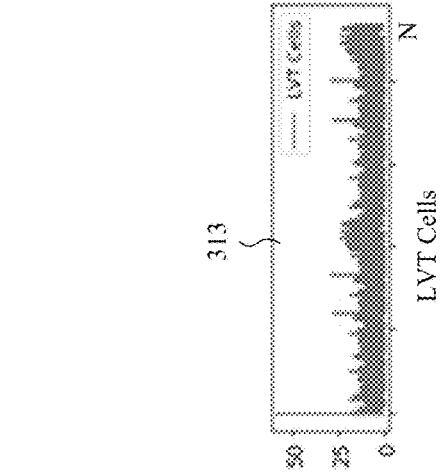
Figure 3B:
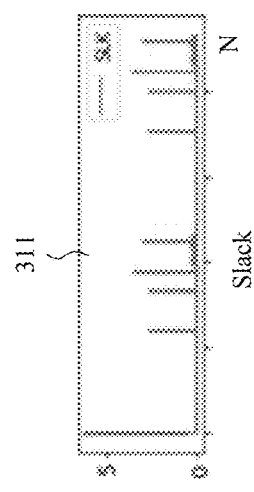
Figure 3B:
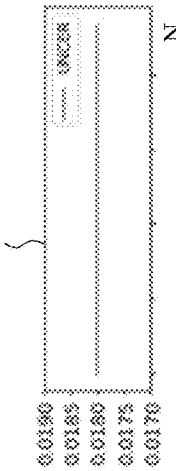
Figure 3C:
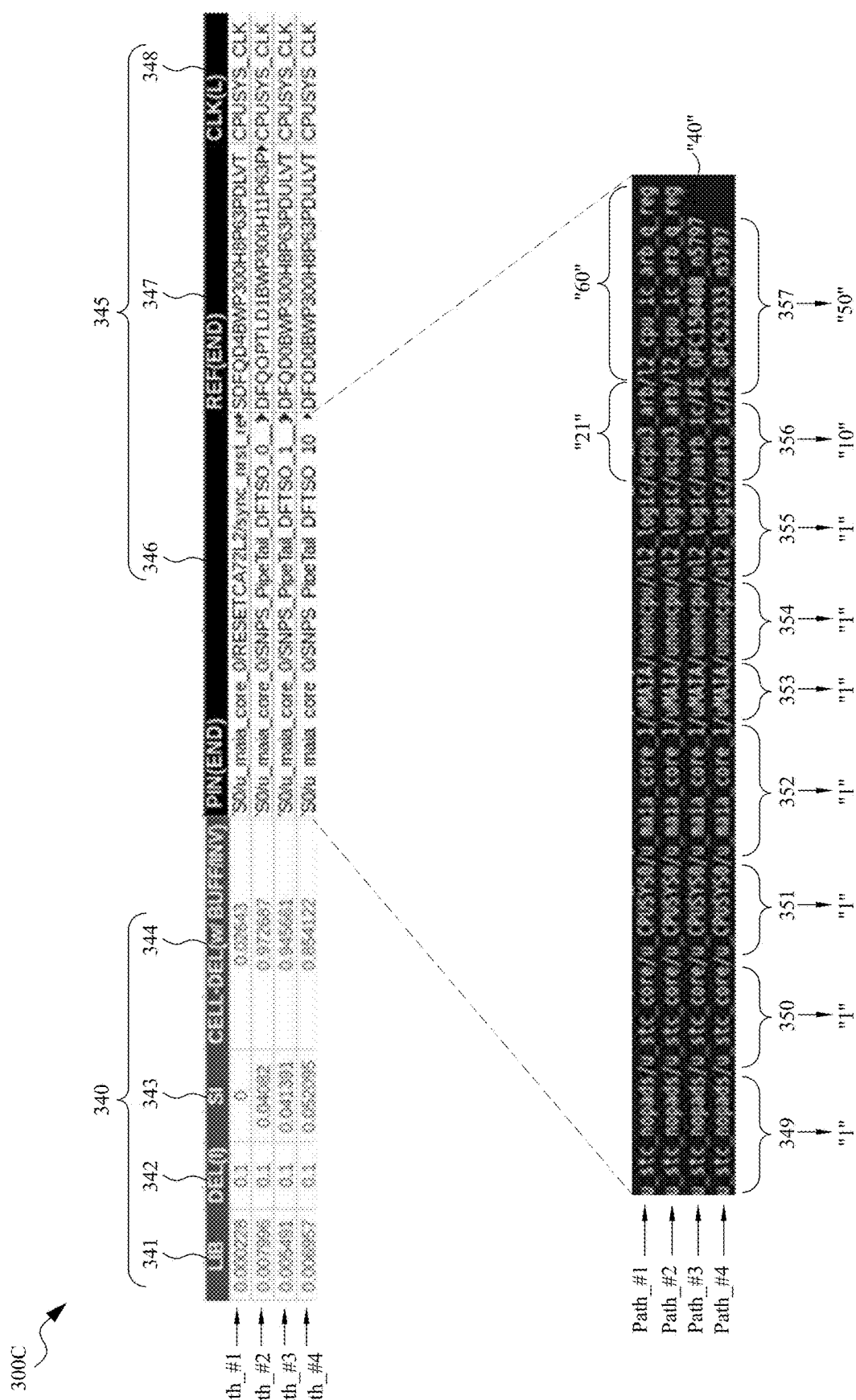
FIG. 3C is a schematic view of a table including various numerical features and categorical features with corresponding values in several example paths in a first encoding operation, in accordance with some embodiments.

At the first encoding operation 323, a non-numerical value corresponding to a name of a pin or an instance (e.g., from a netlist) is encoded or converted into a corresponding converted numerical value, based on one or more hierarchy levels associated with the pin or instance, as described with respect to FIG. 3C.

At the second encoding operation 324, a non-numerical value corresponding to features of a cell is split into a function type and a process parameter, and encoded or converted into corresponding converted numerical values, as described with respect to FIG. 3D.

At the third encoding operation 325, a non-numerical value corresponding to a further feature is encoded or converted into a corresponding converted numerical value, using ordinal encoding, as described with respect to FIG. 3E.

At a normalization operation 326 of the feature encoding operation 320, the numerical values of the numerical features and the converted numerical values of the categorical features are normalized, as described with respect to FIG. 3F. The described operations in the feature encoding operation 320 are example. Other arrangements for converting non-numerical values to converted numerical values are within the scopes of various embodiments.

At the second feature reduction operation 330, based on the normalized values output from the normalization operation 326, one or more features are further removed based on correlation with slack, as described with respect to FIG. 3G. As a result, a reduced set of features is obtained, as described with respect to FIG. 3H.

FIG. 3B is a schematic data representation 300B of example features in the first feature reduction operation 310, in accordance with some embodiments. For simplicity, schematic data representations of a limited number of example features "slack," "clock uncertainty," "LVT cells," "net length" and "net area" are illustrated in FIG. 3B, in the form of corresponding graphs 311-315. The abscissa of each graph 311-315 indicates the number N of paths in the plurality of paths of the IC layout diagram. The ordinate of each graph 311-315 indicates a value of the corresponding feature for each of the N paths. The data presentations are for illustrative purposes, and are omitted in one or more embodiments.

In some embodiments, all features extracted by the feature extraction operation 152 are analyzed to determine variations of the features across the plurality of paths of the IC layout diagram. Features that show no variation across the N paths are removed from further analysis. For example, as shown at graph 312, the value of "clock uncertainty" remains unchanged across the N paths of the IC layout diagram. As a result, "clock uncertainty" is removed from further analysis. Other example features "slack," "LVT cells," "net length" and "net area" have values that vary across the N paths, and are maintained for further analysis. In at least one embodiment, features with incomplete information are also removed from further analysis.

In at least one embodiment, the described removal of one or more features based on data variation and/or information incompleteness is a simple way to reduce the number of features subject to further analysis, thereby reducing the calculation workload.

FIG. 3C is a schematic view of a table 300C including various numerical features 340 and categorical features 345 with corresponding values in several example paths Path_#1 through Path_#4 among the N paths of the IC layout diagram, in accordance with some embodiments. The numerical features 340 include numerical features 341-344 which are timing features corresponding to one or more of the timing features 240 described with respect to FIG. 2G. As shown in FIG. 3C, the numerical features 341-344 have numerical values for each of Path_#1 through Path_#4. In this example, the numerical values of the numerical features 341-344 are delay times. The categorical features 345 include categorical features 346-348 which are logical features corresponding to one or more of the logical features 250 described with respect to FIG. 2G. As shown in FIG. 3C, the categorical features 346-348 have non-numerical values which are presented in the form of strings of characters. In this example, the strings of characters of the categorical features 346-348 indicate pin or instance names, cell features, and clock, respectively. The list of features shown in FIG. 3C is an example and is not exhaustive.

Non-numerical values of the categorical feature 346 are shown in more detail in the enlarged view in FIG. 3C, to provide an example of pin or instance name encoding in the first encoding operation 323. Each non-numerical value of the categorical feature 346 indicates a name of a pin or an instance in a corresponding one of Path_#1 through Path_#4. Each pin or instance name is presented in the form of a string of characters which includes one or more slash characters "/" to indicate a plurality of hierarchy levels associated with the pin or instance. In the example configuration in FIG. 3C, there are nine hierarchy levels 349-357 in each of the non-numerical values of the categorical feature 346. The hierarchy level 349 is the highest level, followed by the level 350, and so on, down to the lowest level 357. The string segment in each of the hierarchy levels 349-357 is encoded to be a number, in accordance with a predetermined encoding scheme. For example, the string segment "u12_logic" at the hierarchy level 355 is encoded to a number "1" for all Path_#1 through Path_#4. Similarly, the string segment at each of the hierarchy levels 349-354 is encoded to a number "1" for all Path_#1 through Path_#4. At the hierarchy levels 356, 357, the string segments in the Path_#1 through Path_#4 are different and, therefore, are encoded to different numbers. Specifically, at the hierarchy level 356, the string segment "ucpu3_arb" is the same in Path_#1 and Path_#2 and is encoded to "21" in Path_#1 and Path_#2, whereas the string segment "uarb_1c" is the same in Path_#3 and Path_#4 and is encoded to "10" in Path_#3 and Path_#4. At the hierarchy level 357, the string segment is the same in Path_#1 and Path_#2 and is encoded to "60" in Path_#1 and Path_#2, whereas different string segments in Path_#3 and Path_#4 are encoded to "40" and "50," respectively. As a result of the described pin or instance name encoding operation 323, the non-numerical values of the categorical feature 346 for Path_#1 through Path_#4 are encoded to corresponding converted numerical values "11111112160," "11111112160," "11111111040," and "11111111050," respectively, as also illustrated in FIG. 3F.

FIG. 3D is a schematic view of a table 300D including the categorical feature 347 with corresponding non-numerical values being encoded in the second encoding operation 324, in accordance with some embodiments. The categorical feature 347 includes several features of a cell, and is split into further categorical features 360, 361 indicating a cell function type and a process parameter of the cell, respectively. Each non-numerical value or a string of characters of the categorical feature 347 is also split into shorter segments corresponding to the categorical features 360, 361. For example, the non-numerical value or a string of characters "DFRPQD4BWP300H8P63PDULVT" of the categorical feature 347 is split into a string segment 362 "DFRPQ," a string segment 363 "D4," a string segment 364 "BWP300H8P63PD," and a string segment 365 "ULVT." The string segment 362 "DFRPQ" indicates the cell function type being a flip-flop, and is converted to a non-numerical value 366 "Flop" of the categorical feature 360. The string segment 363 "D4" indicates the driving strength of the cell. In the example in FIG. 3D, the driving strength is not shown further for simplicity. However, it is within the scopes of one or more embodiments to include this feature in further analysis. The string segment 364 "BWP300H8P63PD" indicates the process parameter, and is converted to a non-numerical value 367 "BWP300H8P63P" of the categorical feature 361. The string segment 365 "ULVT" indicates the threshold voltage of the cell. In the example in FIG. 3D, the threshold voltage is not shown further for simplicity. However, it is within the scopes of one or more embodiments to include this feature in further analysis. Similarly, to the first encoding operation 323, each of the non-numerical values 366, 367 is encoded to be a number, in accordance with a predetermined encoding scheme. For example, the non-numerical value 366 "Flop" is encoded to a corresponding converted numerical value 368 "1," and the non-numerical value 367 "BWP300H8P63P" is encoded to a corresponding converted numerical value 369 "1." The other non-numerical values, collectively indicated in FIG. 3D at 370, of the categorical feature 347 are similarly split and encoded to corresponding converted numerical values, collectively indicated in FIG. 3D at 371.

FIG. 3E is a schematic view of a table 300E including the categorical feature 348 with corresponding non-numerical values being encoded in the third encoding operation 325, in accordance with some embodiments. Similarly, to the first encoding operation 323, each of the non-numerical values of the categorical feature 348 is encoded to be a number, in accordance with a predetermined encoding scheme, e.g., an ordinal encoding. For example, the non-numerical value "CA72_ACLK" is encoded to a corresponding converted numerical value "1." The other non-numerical values of the categorical feature 348 are similarly encoded, as indicated in FIG. 3E.

FIG. 3F is a schematic view of a table 300F including various numerical features 340 and categorical features 345 with corresponding numerical and converted numerical values in the normalization operation 326, in accordance with some embodiments. The table 300F includes numerical values of the numerical features 340, collectively indicated in FIG. 3F at 372, and converted numerical values of the categorical features 345, collectively indicated in FIG. 3F at 373. The numerical values 372 of the numerical features 340 are the same as corresponding numerical values in the table 300C. The converted numerical values 373 of the categorical features 345 are obtained by encoding or converting the corresponding non-numerical values of the categorical features 345 in the first-third encoding operations 323-325, as described with respect to FIGS. 3C-3E. The numerical and converted numerical values 372, 373 are normalized to obtain corresponding normalized values 380. For example, the numerical values "0.000228," "0.007996," "0.005491" and "0.006957" of the numerical feature 341 (hereinafter feature LIB) are normalized to obtain corresponding normalized values "0.01502," "0.08514," "0.04104" and "0.05694."

As a result of the normalization operation 326, each feature has a plurality of normalized values corresponding to N paths of the IC layout diagram. For example, feature LIB has normalized values "0.01502," "0.08514," "0.04104" and "0.05694" for Path_#1 through Path_#4. Likewise, the feature slack also has normalized values (not shown) for Path_#1 through Path_#4. These two sets of normalized values for the features LIB and slack are used to determine a correlation coefficient between the features LIB and slack in the second feature reduction operation 330. In at least one embodiment, a reason why slack is chosen to be the base feature for determining correlation with the other features is because testing is done for timing verification and/or because the STA operation 140 in one or more embodiments is configured for slack optimization. Base features, other than slack, for determining correlation are within the scopes of various embodiments.

In some embodiments, the following formula (1) is used to calculate a correlation coefficient $$r_{xy} = \frac{\sum_{n=1}^{N}(x_i - \bar{x})(y_i - \bar{y})}{\sqrt{\sum_{n=1}^{N}(x_i - \bar{x})^2}\sqrt{\sum_{n=1}^{N}(y_i - \bar{y})^2}} \quad (1)$$

where $r_{xy}$ is the correlation coefficient, xi is the normalized value of slack at the i-th path among the N paths of the IC layout diagram, $y_i$ is the normalized value of another feature, e.g., LIB, at the i-th path, $\bar{x}$ is the mean of all normalized values of slack across all N paths, and $\bar{y}$ is the mean of all normalized values of LIB across all N paths. The correlation coefficients between slack and other features are similarly calculated, and example results are given in FIG. 3G.

FIG. 3G is a schematic view of a table 300G including various features with corresponding correlation coefficients in the second feature reduction operation 330, in accordance with some embodiments. As illustrated at 391, the correlation coefficient calculated as described herein between LIB and slack across N paths of the IC layout diagram is "0.178542" in this example. In the table 300G, the correlation coefficients are sorted in the descending order.

Features corresponding to the correlation coefficients within a predetermined range 393 are removed from further analysis. In some embodiments, the predetermined range is between −0.15 and 0.15. Features with the correlation coefficients in this predetermined range around zero are considered to have little or no correlation with slack. When there is a variation in such a feature, e.g., ViaCount (the number of vias in a path) as indicated at 394, slack will be unlikely affected due to the little or no correlation between ViaCount and slack. In other words, in this specific example, ViaCount due to its low correlation with slack is considered to have little or no significant effect on slack and timing performance. The feature ViaCount is therefore removed from further analysis. In at least one embodiment, this removal reduces the calculation workload at further, subsequent analysis. Other predetermined ranges for removing features considered to have little or no correlation with slack are within the scopes of various embodiments.

Features corresponding to the correlation coefficients outside the predetermined range 393 are retained for further analysis. For example, features corresponding to the correlation coefficients in ranges 395 and 396 respectively above and below the predetermined range 393 are retained for further analysis. Features corresponding to the correlation coefficients in the range 395 have positive correlation with slack, which means when a value of one of these features is increased, there is a likelihood that slack is also increased. Features corresponding to the correlation coefficients in the range 396 have negative correlation with slack, which means when a value of one of these features is increased, there is a likelihood that slack is decreased. Due to the sufficient correlation with slack, the features corresponding to the correlation coefficients in the ranges 395, 396 are considered to have potential effect on slack and timing performance. These features are retained for further analysis, and together constitute a reduced set of features an example of which is given in FIG. 3H.

Figure 3H:
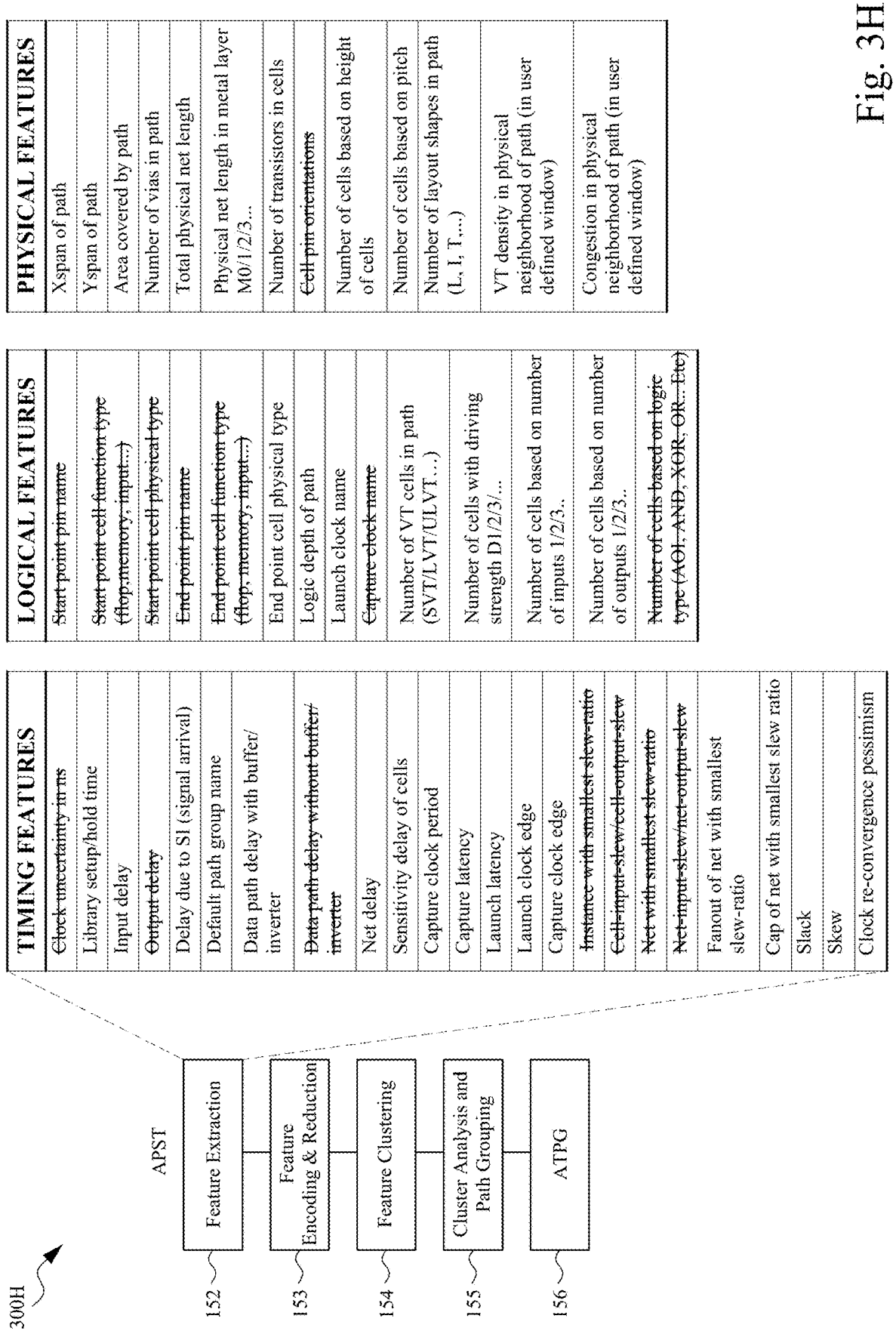
FIG. 3H is a schematic view of a reduced set of features of paths in an IC layout diagram, in accordance with some embodiments.

FIG. 3H is a schematic view showing a reduced set 300H of features of paths in an IC layout diagram, in accordance with some embodiments. The reduced set 300H lists all extracted features as in the feature list 200G in FIG. 2G. However, features that have been removed by the first feature reduction operation 310 based on data variation and the second feature reduction operation 330 based on correlation with slack are indicated as being stricken through in the reduced set 300H. The reduced set 300H is an example result of the feature encoding and reduction operation 153. In at least one embodiment, the encoding processing in the feature encoding and reduction operation 153 makes it possible to analyze categorical features in a manner similar to numerical features as described herein. In at least one embodiment, the feature reduction in the feature encoding and reduction operation 153 makes it possible to remove features that are unlikely to affect timing performance and to reduce calculation workload.

FIG. 4 is a flow chart of a process 400 in the feature clustering operation 154 and cluster analysis and path grouping operation 155, in accordance with some embodiments. The feature clustering operation 154 comprises operations 410, 420 with which the paths of the IC layout diagram are clustered or divided into a plurality of clusters. The cluster analysis and path grouping operation 155 comprises operations 430, 440, 450 with which the clusters are analyzed and grouped into a plurality of groups with associated unique dominant features.

At operation 410, a number of clusters into which the N paths of the IC layout diagram are to be divided is determined. In some embodiments, the following formula (2) is used to calculate the number k of clusters:

$$k = \sqrt[3]{N/2} \qquad (2)$$

At operation 420, a clustering algorithm is applied for clustering the N paths. In some embodiments, the clustering algorithm applied in operation 420 is K-means clustering. K-means clustering is used in unsupervised learning. Other clustering algorithms are within the scopes of various embodiments.

Data for K-means clustering include the reduced set 300H of m features obtained as a result of the feature encoding and reduction operation 153, and the normalized values of the m features in the N paths obtained as a result of the normalization operation 326. Each path is presented as a data point including m normalized values of the m features. The objective of K-means clustering is to cluster the N data points into k clusters $S_1 \ldots S_k$ in an iterative process to achieve the following minimization:

$$\underset{s}{\operatorname{argmin}} \sum_{i=1}^{k} \frac{1}{2|S_i|} \sum_{x,y \in S_i} \|x - y\|^2 \qquad (3)$$

At operation 430, a biasing of each of the m features is calculated in each of the k clusters, for example, using the following formula:

$$CB_{nx} = (CM_{nx} - DS_x)/DS_x \qquad (4)$$

where $CB_{nx}$ is a biasing of feature x in cluster n, $CM_{nx}$ is a mean value of feature x in the paths in cluster n, and $DS_x$ is a mean value of feature x in all N paths.

At operation 440, based on the biasing of each feature in each cluster calculated at operation 430, a dominant feature is determined for each cluster. For example, for each cluster n, when $(CB_{nx}/\Sigma_{i=1}^{m} CB_{ni})$ is greater than a predetermined threshold X, cluster n is biased toward feature x, and feature x is determined as the dominant feature of cluster n. In some embodiments, the threshold X for determining whether cluster n is biased toward feature x is a value from 40% to 60%. Any other values of the threshold X are within the scopes of various embodiments. For example, in one or more embodiments, the threshold X is 70%, 85%, or 90%. In at least one embodiment with the threshold X being greater than 50%, there is a maximum of one feature satisfying the condition $(CB_{nx}/\Sigma_{i=1}^{m} CB_{ni}) > X$ in a cluster. In at least one embodiment with the threshold X being 50% or lower, there is a potential situation where more than one features satisfy the condition $(CB_{nx}/\Sigma_{i=1}^{m} CB_{ni}) > X$ in a cluster. In such a situation, the cluster is determined to be dominated by more than one features.

When no cluster has $(CB_{nx}/\Sigma_{i=1}^{m} CB_{ni})$ greater than the predetermined threshold X for feature x, the cluster with the greatest $(CB_{nx}/\Sigma_{i=1}^{m} CB_{ni})$ is determined to have feature x as the dominant feature. This determination is applicable even when the cluster with the greatest $(CB_{nx}/\Sigma_{i=1}^{m} CB_{ni})$ is already determined to have a dominant feature other than feature x. It is within the scope of one or more embodiments that a cluster has more than one dominant features. It is also within the scope of one or more embodiments that a feature is determined to be a dominant feature of more than one clusters.

As a result of the operation 440, each of the k clusters has at least one dominant feature being one of the m features, and each of the m features is determined as a dominant feature of at least one of the k clusters.

At operation 450, m groups of paths are created from the k clusters, so that each group has a unique dominant feature that is different from dominant features of the other groups. For example, when, among the k clusters, a first feature has been determined to be the dominant feature of only one cluster, then that cluster is designated as the group having the first feature as the dominant feature. Further, when, among the k clusters, a second feature has been determined to be the dominant feature of more than one clusters, such clusters are merged together into the group having the second feature as the dominant feature. In some embodiments, each path is included in one group, resulting in a plurality of non-overlapping groups. In a further example, where a cluster has been determined to have several dominant features, the cluster is merged into several groups corresponding to the several dominant features. As a result, at least one embodiment includes a potential situation in which a path is included in more than one groups.

In some embodiments, as a result of the operation 450 of the cluster analysis and path grouping operation 155, the N paths of the IC layout diagram are grouped into m groups with m different dominant features each corresponding to one of the m features in the reduced set 300H of features obtained by the feature encoding and reduction operation 153. A dominant feature of a group is a feature by which the paths in the group are dominated, as described with respect to FIGS. 2B-2F. For example, the paths in a group having metal layer M3 as the dominant feature are dominated by metal layer M3, as described with respect to FIG. 2B.

As can be seen in FIG. 4, after the operation 450 of the cluster analysis and path grouping operation 155, the process proceeds to the ATPG operation 156 where one or more ATPG methods or algorithms are used to generate test patterns for one or more paths in each group for which a dominant feature has been designated. A specific example is described herein for a group having metal layer M3 as the dominant feature.

Specifically, the paths in the group having metal layer M3 as the dominant feature are identified in a report, e.g., a netlist, from the cluster analysis and path grouping operation 155 to the ATPG operation 156 for subsequent testing. In practice, not all paths in the group are testable, due the large number of paths or a specific nature of a path that renders the path untestable. For all testable paths in the group, the ATPG operation 156 generates corresponding test patterns. The generated test patterns vary from path to path depending on, for example, the types and/or number of cells or gates on the path, the test strategy, or the ATPG method or algorithm used to generate the test pattern. An example ATPG strategy used in one or more embodiments is path delay ATPG which is used to generate both robust and non-robust path delay test patterns. As described herein with respect to FIG. 1, the generated test patterns are used in a simulation for IC design verification before fabrication, and/or in an ATE for testing an actual, fabricated IC.

When one of the paths fails the test, because the failed path was identified by the APST operation 150 as belonging to a group with the dominant feature being metal layer M3, it is possible in one or more embodiments to select a correction strategy related to the dominant feature, i.e., metal layer M3, to fix or improve timing performance of the failed path. Such correction strategy related to metal layer M3 is expected in at least one embodiment to also improve performance of other paths in the same group dominated by metal layer M3. As a result, it is possible in some embodiments to target or improve multiple paths with a single correction strategy, thereby saving time and efforts in the IC design and/or fabrication process. The above advantage is achievable not only at a simulation before signing-off for fabrication or when testing an actual, fabricated IC, but also at an earlier stage. For example, in at least one embodiment, identified groups of paths with designated dominant features are relied on to define a strategy for fixing timing issues discovered by the STA operation 140.

There are several approaches for fixing or improving a failed path based on the identified dominant feature of the path. In the example with metal layer M3 being the dominant feature, a strategy in accordance with some embodiments is to reroute at least a portion of the failed path in a different metal layer. A further strategy is to tune a manufacturing process to improve formation of interconnects in metal layer M3 and/or other metal layers around metal layer M3. Other correction strategies are within the scopes of various embodiments. The described advantages are not limited to the specific example with metal layer M3 as the dominant feature. Similar advantages are obtainable in one or more embodiments with respect to paths and groups having other dominant features, as described with respect to FIG. 2G or 3H.

Compared to other approaches, it is possible in some embodiments to identify a larger number of paths to be tested, thereby increasing the likelihood of locating and correcting small delay defects (SDDs) while covering a wide range of potential causes for SDDs. As described herein, SDDs involve small delay variations due to various factors including, but not limited to, fabrication process variations, power supply noise, crosstalk, or the like. In some situations, although delays at individual cells or nets are small and within specifications, the cumulative delay of multiple such small delays, especially over a long path, is potentially large enough to cause failure. In order to detect a potential SDD failure, other approaches select and test top critical paths, i.e., longest paths and/or paths with smallest slack based on an STA timing report. Such an approach focuses on a narrow range of issues and potentially results in a small number of paths selected for testing and/or being tested, without providing sufficient coverages for various causes for SDDs.

In contrast, in one or more embodiments, because the paths identified for testing are directed to a wide range of features, as described with respect to FIGS. 2G and 3H, a larger number of paths end up being tested, while covering various potential causes for SDDs. At the same time, critical paths covered by the other approaches are still covered in one or more embodiments which include one or more groups of paths with dominant features being timing features, including slack.

The wide coverage for potential causes for SDDs in at least one embodiment makes it possible to locate and fix various systematic defects which are one of the major challenges in advanced process nodes. Other approaches lack this capability. In some embodiments, further advantages include, but are not limited to, distributed process defect coverage for SDDs, ability to target any specific feature and/or process issue, independence of process nodes.

Figure 5:
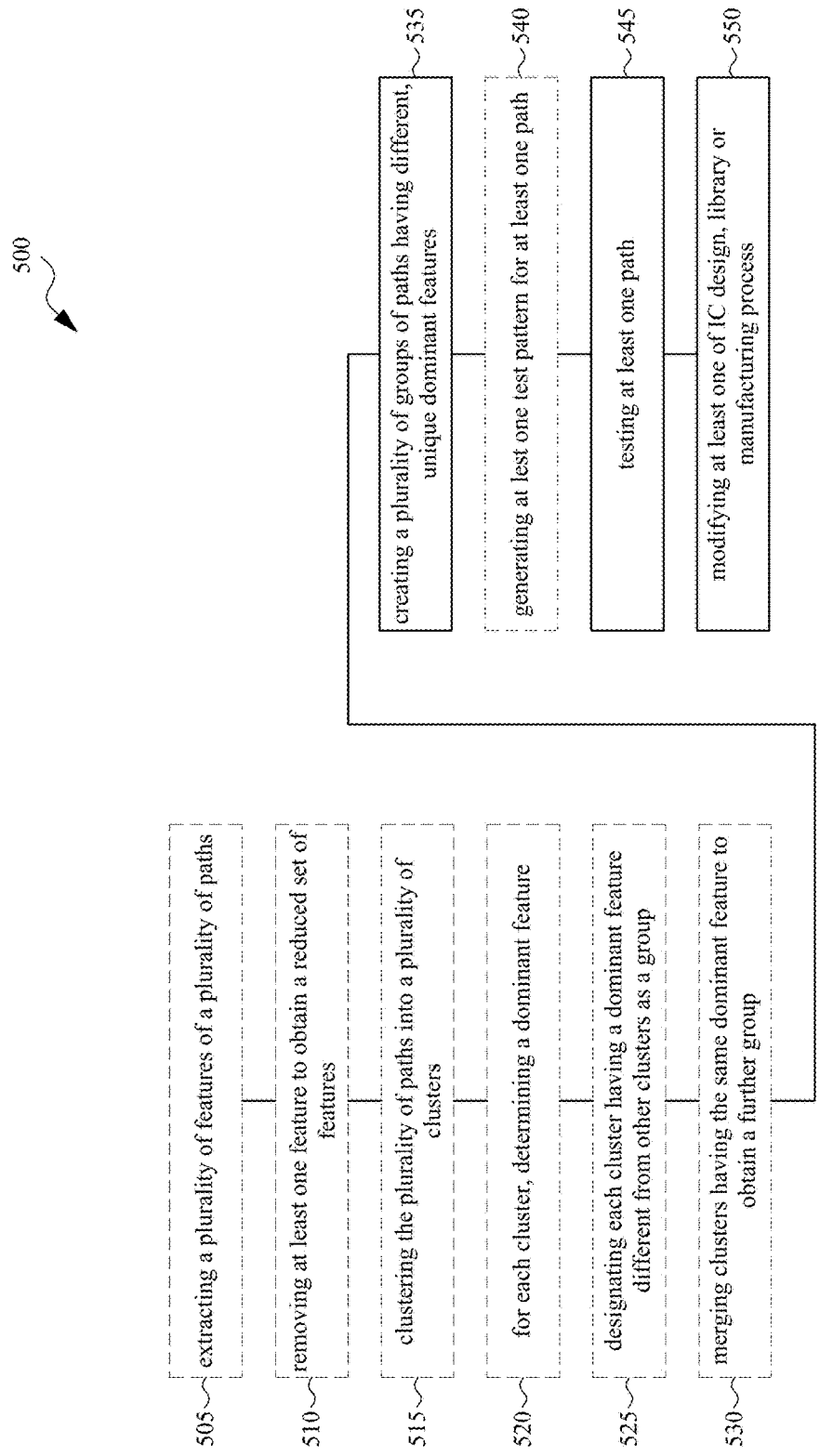
FIG. 5 is a flow chart of a process, in accordance with some embodiments.

FIG. 5 is a flow chart of a method 500, in accordance with some embodiments. In at least one embodiment, method 500 is performed in whole or in part by a processor as described herein.

At operation 505, a plurality of features of a plurality of paths in an integrated circuit (IC) layout diagram is extracted. For example, features are extracted from at least one of a Verilog netlist containing an IC schematic corresponding to the IC layout diagram, one or more DEF and/or LEF files containing the IC layout diagram, a timing report of an STA, or a library, as described with respect to FIG. 2G.

At operation 510, at least one feature is removed from the plurality of features to obtain a reduced set of features, based on a correlation coefficient of the at least one feature with slack across the plurality of paths and/or based on the at least one feature having no variation. For example, a correlation coefficient of each feature with slack across the plurality of paths is calculated, as described with respect to FIG. 3G. In response to the correlation coefficients of one or more features being within a predetermined range, the one or more features are removed from the plurality of features, resulting in a reduced set of features, as described with respect to FIG. 3H. In at least one embodiment, operation 510 is omitted, for example, when all features have variations and the correlation coefficients of all features with slack across the plurality of paths are outside the predetermined range described with respect to FIG. 3G.

At operation 515, the plurality of paths is clustered into a plurality of clusters. For example, a clustering algorithm is applied to divide the plurality of paths into a plurality of clusters, as described with respect to the feature clustering operation 154 in FIG. 4.

At operation 520, a feature included in the reduced set of features is determined as a dominant feature for each cluster among the plurality of clusters. For example, a dominant feature is determined for each cluster, as described with respect to FIG. 4. A dominant feature is a feature by which paths in the cluster are dominated, for example, as described with respect to FIGS. 2B-2F.

At operation 525, each cluster having the dominant feature different from dominant features of other clusters is designated as a group of paths among a plurality of groups of paths to be created from the plurality of clusters, for example, as described with respect to the operation 450 in FIG. 4.

At operation 530, clusters having the same dominant feature are merged to obtain a further group among the plurality of groups, for example, as described with respect to the operation 450 in FIG. 4.

At operation 535, the plurality of groups of paths is created from the plurality of paths in the IC layout diagram, where each group has a dominant feature among the plurality of features of the plurality of paths, and the dominant features of the plurality of groups are different from each other, for example, as a result of operations 525, 530.

At operation 540, at least one test pattern is generated for at least one path in each group among the plurality of groups. For example, automatic test pattern generation (ATPG) is performed to generate at least one test pattern, as described with respect to the ATPG operation 156 in FIG. 4.

At operation 545, at least one path in a group among the plurality of groups is tested. For example, the at least one path is tested by using the generated at least one test pattern in a simulation or by an ATE, as described with respect to the testing operation 160 in FIG. 1.

At operation 550, in response to the testing indicating that the at least one path fails, a modification is made to at least one of the IC layout diagram, at least a portion of at least one library having cells included in the IC layout diagram, or a manufacturing process for manufacturing an IC corresponding to the IC layout diagram. For example, one or more corrections are made to at least one of the IC design, a library or a manufacturing process when a path failed, as described with respect to the modification operation 170 in FIG. 1.

In at least one embodiment, all operations 505-550 are automatically performed without user input or intervention.

The described methods include example operations, but they are not necessarily required to be performed in the order shown. Operations may be added, replaced, changed order, and/or eliminated as appropriate, in accordance with the spirit and scope of embodiments of the disclosure. Embodiments that combine different features and/or different embodiments are within the scope of the disclosure and will be apparent to those of ordinary skill in the art after reviewing this disclosure.

In some embodiments, at least one method(s) discussed above is performed in whole or in part by at least one EDA system. In some embodiments, an EDA system is usable as part of a design house of an IC manufacturing system discussed below.

Figure 6:
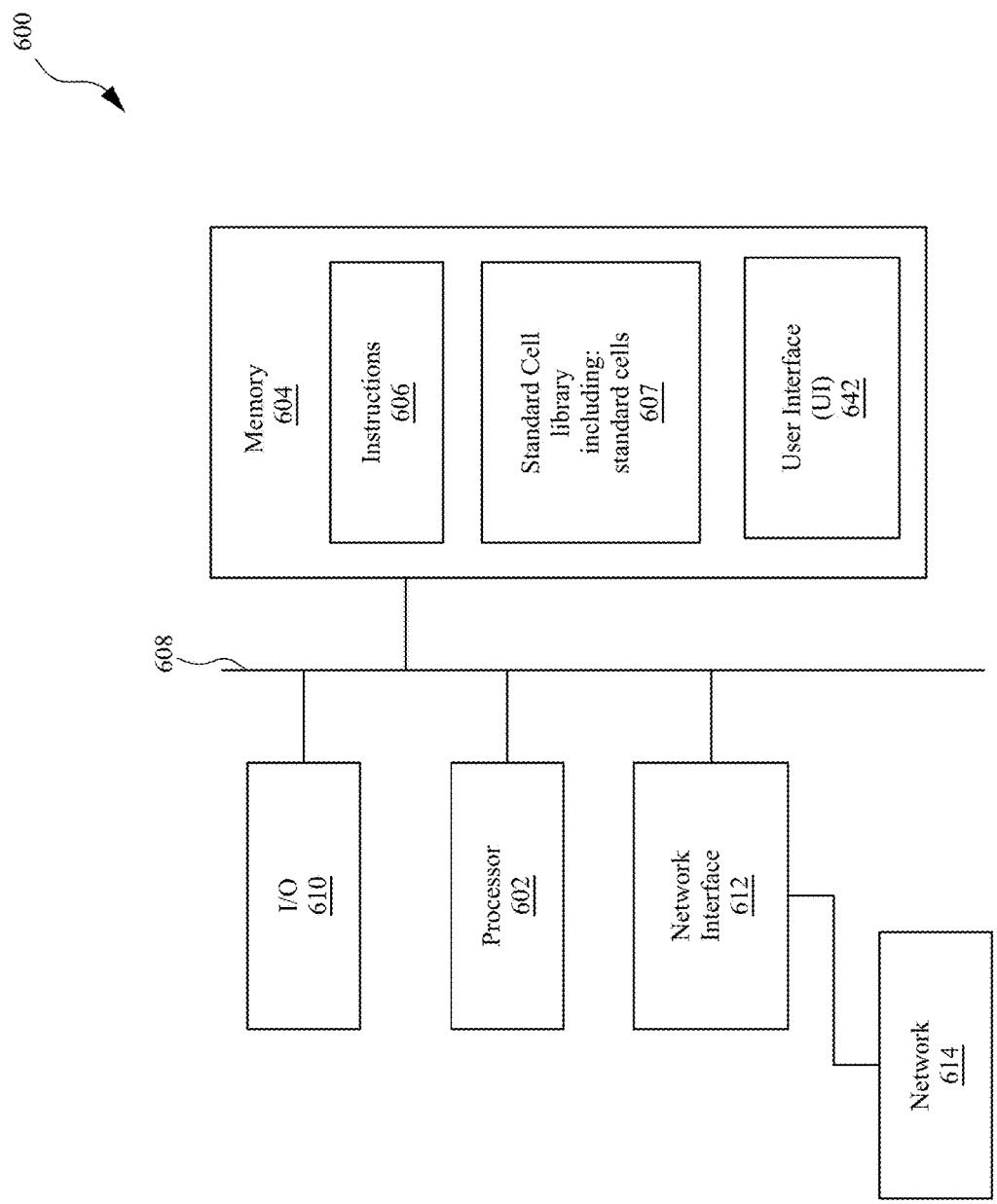
FIG. 6 is a block diagram of an EDA system, in accordance with some embodiments.

FIG. 6 is a block diagram of an electronic design automation (EDA) system 600 in accordance with some embodiments.

In some embodiments, EDA system 600 includes an APR system. Methods described herein of designing layout diagrams represent wire routing arrangements, in accordance with one or more embodiments, are implementable, for example, using EDA system 600, in accordance with some embodiments.

In some embodiments, EDA system 600 is a general purpose computing device including a hardware processor 602 and a non-transitory, computer-readable storage medium 604. Storage medium 604, amongst other things, is encoded with, i.e., stores, computer program code 606, i.e., a set of executable instructions. Execution of instructions 606 by hardware processor 602 represents (at least in part) an EDA tool which implements a portion or all of the methods described herein in accordance with one or more embodiments (hereinafter, the noted processes and/or methods).

Processor 602 is electrically coupled to computer-readable storage medium 604 via a bus 608. Processor 602 is also electrically coupled to an I/O interface 610 by bus 608. A network interface 612 is also electrically connected to processor 602 via bus 608. Network interface 612 is connected to a network 614, so that processor 602 and computer-readable storage medium 604 are capable of connecting to external elements via network 614. Processor 602 is configured to execute computer program code 606 encoded in computer-readable storage medium 604 in order to cause system 600 to be usable for performing a portion or all of the noted processes and/or methods. In one or more embodiments, processor 602 is a central processing unit (CPU), a multi-processor, a distributed processing system, an application specific integrated circuit (ASIC), and/or a suitable processing unit.

In one or more embodiments, computer-readable storage medium 604 is an electronic, magnetic, optical, electromagnetic, infrared, and/or a semiconductor system (or apparatus or device). For example, computer-readable storage medium 604 includes a semiconductor or solid-state memory, a magnetic tape, a removable computer diskette, a random access memory (RAM), a read-only memory (ROM), a rigid magnetic disk, and/or an optical disk. In one or more embodiments using optical disks, computer-readable storage medium 604 includes a compact disk-read only memory (CD-ROM), a compact disk-read/write (CD-R/W), and/or a digital video disc (DVD).

In one or more embodiments, storage medium 604 stores computer program code 606 configured to cause system 600 (where such execution represents (at least in part) the EDA tool) to be usable for performing a portion or all of the noted processes and/or methods. In one or more embodiments, storage medium 604 also stores information which facilitates performing a portion or all of the noted processes and/or methods. In one or more embodiments, storage medium 604 stores library 607 of standard cells including such standard cells as disclosed herein.

EDA system 600 includes I/O interface 610. I/O interface 610 is coupled to external circuitry. In one or more embodiments, I/O interface 610 includes a keyboard, keypad, mouse, trackball, trackpad, touchscreen, and/or cursor direction keys for communicating information and commands to processor 602.

EDA system 600 also includes network interface 612 coupled to processor 602. Network interface 612 allows system 600 to communicate with network 614, to which one or more other computer systems are connected. Network interface 612 includes wireless network interfaces such as BLUETOOTH, WIFI, WIMAX, GPRS, or WCDMA; or wired network interfaces such as ETHERNET, USB, or IEEE-1364. In one or more embodiments, a portion or all of noted processes and/or methods, is implemented in two or more systems 600.

System 600 is configured to receive information through I/O interface 610. The information received through I/O interface 610 includes one or more of instructions, data, design rules, libraries of standard cells, and/or other parameters for processing by processor 602. The information is transferred to processor 602 via bus 608. EDA system 600 is configured to receive information related to a UI through I/O interface 610. The information is stored in computer-readable medium 604 as user interface (UI) 642.

In some embodiments, a portion or all of the noted processes and/or methods is implemented as a standalone software application for execution by a processor. In some embodiments, a portion or all of the noted processes and/or methods is implemented as a software application that is a part of an additional software application. In some embodiments, a portion or all of the noted processes and/or methods is implemented as a plug-in to a software application. In some embodiments, at least one of the noted processes and/or methods is implemented as a software application that is a portion of an EDA tool. In some embodiments, a portion or all of the noted processes and/or methods is implemented as a software application that is used by EDA system 600. In some embodiments, a layout diagram which includes standard cells is generated using a tool such as VIRTUOSO® available from CADENCE DESIGN SYSTEMS, Inc., or another suitable layout generating tool.

In some embodiments, the processes are realized as functions of a program stored in a non-transitory computer readable recording medium. Examples of a non-transitory computer readable recording medium include, but are not limited to, external/removable and/or internal/built-in storage or memory unit, e.g., one or more of an optical disk, such as a DVD, a magnetic disk, such as a hard disk, a semiconductor memory, such as a ROM, a RAM, a memory card, and the like.

Figure 7:
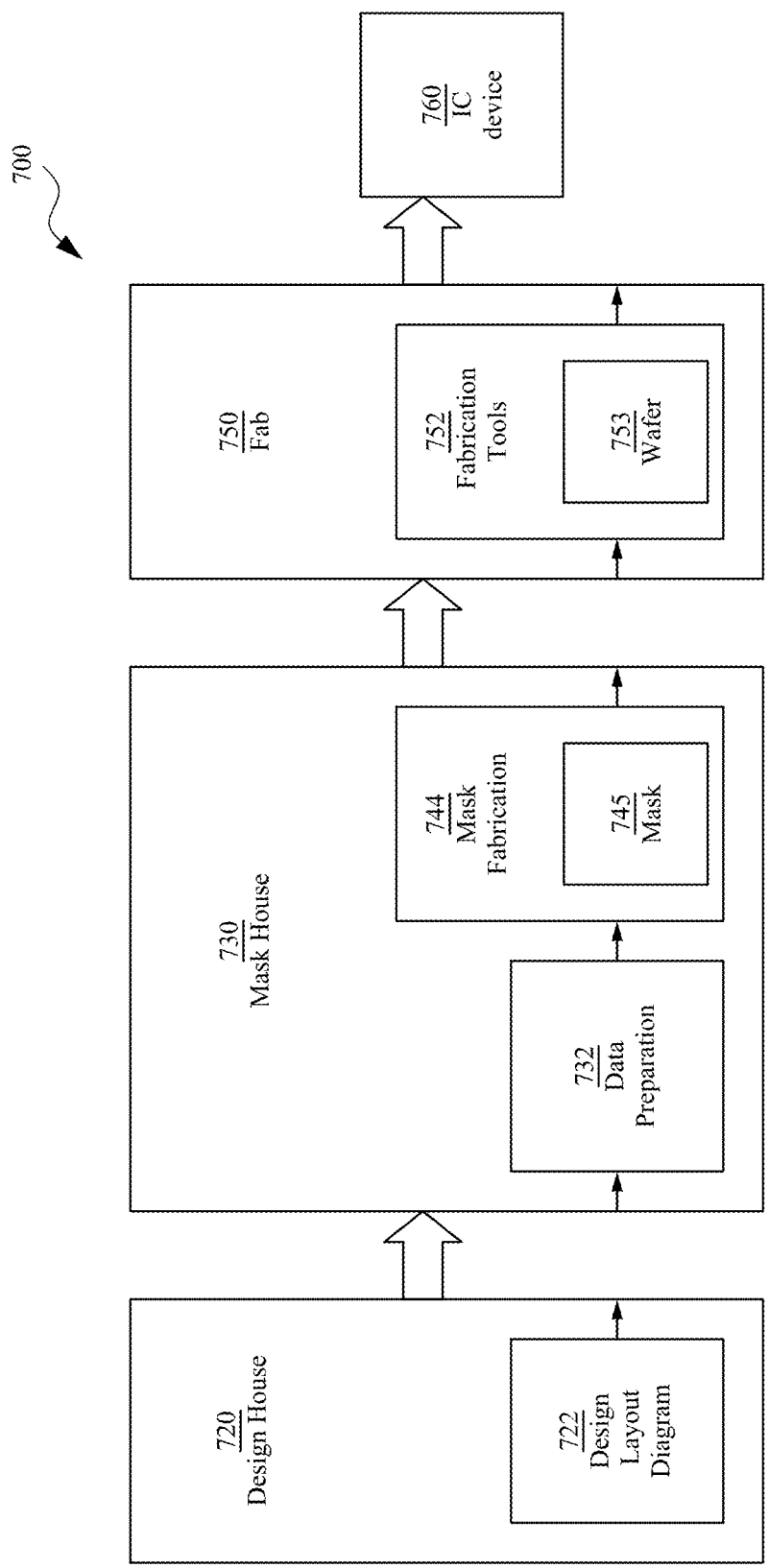
FIG. 7 is a block diagram of an IC manufacturing system and an IC manufacturing flow associated therewith, in accordance with some embodiments.

FIG. 7 is a block diagram of an integrated circuit (IC) manufacturing system 700, and an IC manufacturing flow associated therewith, in accordance with some embodiments. In some embodiments, based on a layout diagram, at least one of (A) one or more semiconductor masks or (B) at least one component in a layer of a semiconductor integrated circuit is fabricated using manufacturing system 700.

In FIG. 7, IC manufacturing system 700 includes entities, such as a design house 720, a mask house 730, and an IC manufacturer/fabricator ("fab") 750, that interact with one another in the design, development, and manufacturing cycles and/or services related to manufacturing an IC device 760. The entities in system 700 are connected by a communications network. In some embodiments, the communications network is a single network. In some embodiments, the communications network is a variety of different networks, such as an intranet and the Internet. The communications network includes wired and/or wireless communication channels. Each entity interacts with one or more of the other entities and provides services to and/or receives services from one or more of the other entities. In some embodiments, two or more of design house 720, mask house 730, and IC fab 750 is owned by a single larger company. In some embodiments, two or more of design house 720, mask house 730, and IC fab 750 coexist in a common facility and use common resources.

Design house (or design team) 720 generates an IC design layout diagram 722. IC design layout diagram 722 includes various geometrical patterns designed for an IC device 760. The geometrical patterns correspond to patterns of metal, oxide, or semiconductor layers that make up the various components of IC device 760 to be fabricated. The various layers combine to form various IC features. For example, a portion of IC design layout diagram 722 includes various IC features, such as an active region, gate electrode, source and drain, metal lines or vias of an interlayer interconnection, and openings for bonding pads, to be formed in a semiconductor substrate (such as a silicon wafer) and various material layers disposed on the semiconductor substrate. Design house 720 implements a proper design procedure to form IC design layout diagram 722. The design procedure includes one or more of logic design, physical design or place-and-route operation. IC design layout diagram 722 is presented in one or more data files having information of the geometrical patterns. For example, IC design layout diagram 722 can be expressed in a GDSII file format or DFII file format.

Mask house 730 includes data preparation 732 and mask fabrication 744. Mask house 730 uses IC design layout diagram 722 to manufacture one or more masks 745 to be used for fabricating the various layers of IC device 760 according to IC design layout diagram 722. Mask house 730 performs mask data preparation 732, where IC design layout diagram 722 is translated into a representative data file ("RDF"). Mask data preparation 732 provides the RDF to mask fabrication 744. Mask fabrication 744 includes a mask writer. A mask writer converts the RDF to an image on a substrate, such as a mask (reticle) 745 or a semiconductor wafer 753. The design layout diagram 722 is manipulated by mask data preparation 732 to comply with particular characteristics of the mask writer and/or requirements of IC fab 750. In FIG. 7, mask data preparation 732 and mask fabrication 744 are illustrated as separate elements. In some embodiments, mask data preparation 732 and mask fabrication 744 can be collectively referred to as mask data preparation.

In some embodiments, mask data preparation 732 includes optical proximity correction (OPC) which uses lithography enhancement techniques to compensate for image errors, such as those that can arise from diffraction, interference, other process effects and the like. OPC adjusts IC design layout diagram 722. In some embodiments, mask data preparation 732 includes further resolution enhancement techniques (RET), such as off-axis illumination, sub-resolution assist features, phase-shifting masks, other suitable techniques, and the like or combinations thereof. In some embodiments, inverse lithography technology (ILT) is also used, which treats OPC as an inverse imaging problem.

In some embodiments, mask data preparation 732 includes a mask rule checker (MRC) that checks the IC design layout diagram 722 that has undergone processes in OPC with a set of mask creation rules which contain certain geometric and/or connectivity restrictions to ensure sufficient margins, to account for variability in semiconductor manufacturing processes, and the like. In some embodiments, the MRC modifies the IC design layout diagram 722 to compensate for limitations during mask fabrication 744, which may undo part of the modifications performed by OPC in order to meet mask creation rules.

In some embodiments, mask data preparation 732 includes lithography process checking (LPC) that simulates processing that will be implemented by IC fab 750 to fabricate IC device 760. LPC simulates this processing based on IC design layout diagram 722 to create a simulated manufactured device, such as IC device 760. The processing parameters in LPC simulation can include parameters associated with various processes of the IC manufacturing cycle, parameters associated with tools used for manufacturing the IC, and/or other aspects of the manufacturing process. LPC takes into account various factors, such as aerial image contrast, depth of focus ("DOF"), mask error enhancement factor ("MEEF"), other suitable factors, and the like or combinations thereof. In some embodiments, after a simulated manufactured device has been created by LPC, if the simulated device is not close enough in shape to satisfy design rules, OPC and/or MRC are be repeated to further refine IC design layout diagram 722.

It should be understood that the above description of mask data preparation 732 has been simplified for the purposes of clarity. In some embodiments, data preparation 732 includes additional features such as a logic operation (LOP) to modify the IC design layout diagram 722 according to manufacturing rules. Additionally, the processes applied to IC design layout diagram 722 during data preparation 732 may be executed in a variety of different orders.

After mask data preparation 732 and during mask fabrication 744, a mask 745 or a group of masks 745 are fabricated based on the modified IC design layout diagram 722. In some embodiments, mask fabrication 744 includes performing one or more lithographic exposures based on IC design layout diagram 722. In some embodiments, an electron-beam (e-beam) or a mechanism of multiple e-beams is used to form a pattern on a mask (photomask or reticle) 745 based on the modified IC design layout diagram 722. Mask 745 can be formed in various technologies. In some embodiments, mask 745 is formed using binary technology. In some embodiments, a mask pattern includes opaque regions and transparent regions. A radiation beam, such as an ultraviolet (UV) beam, used to expose the image sensitive material layer (e.g., photoresist) which has been coated on a wafer, is blocked by the opaque region and transmits through the transparent regions. In one example, a binary mask version of mask 745 includes a transparent substrate (e.g., fused quartz) and an opaque material (e.g., chromium) coated in the opaque regions of the binary mask. In another example, mask 745 is formed using a phase shift technology. In a phase shift mask (PSM) version of mask 745, various features in the pattern formed on the phase shift mask are configured to have proper phase difference to enhance the resolution and imaging quality. In various examples, the phase shift mask can be attenuated PSM or alternating PSM. The mask(s) generated by mask fabrication 744 is used in a variety of processes. For example, such a mask(s) is used in an ion implantation process to form various doped regions in semiconductor wafer 753, in an etching process to form various etching regions in semiconductor wafer 753, and/or in other suitable processes.

IC fab 750 is an IC fabrication business that includes one or more manufacturing facilities for the fabrication of a variety of different IC products. In some embodiments, IC Fab 750 is a semiconductor foundry. For example, there may be a manufacturing facility for the front end fabrication of a plurality of IC products (front-end-of-line (FEOL) fabrication), while a second manufacturing facility may provide the back end fabrication for the interconnection and packaging of the IC products (back-end-of-line (BEOL) fabrication), and a third manufacturing facility may provide other services for the foundry business.

IC fab 750 includes fabrication tools 752 configured to execute various manufacturing operations on semiconductor wafer 753 such that IC device 760 is fabricated in accordance with the mask(s), e.g., mask 745. In various embodiments, fabrication tools 752 include one or more of a wafer stepper, an ion implanter, a photoresist coater, a process chamber, e.g., a CVD chamber or LPCVD furnace, a CMP system, a plasma etch system, a wafer cleaning system, or other manufacturing equipment capable of performing one or more suitable manufacturing processes as discussed herein.

IC fab 750 uses mask(s) 745 fabricated by mask house 730 to fabricate IC device 760. Thus, IC fab 750 at least indirectly uses IC design layout diagram 722 to fabricate IC device 760. In some embodiments, semiconductor wafer 753 is fabricated by IC fab 750 using mask(s) 745 to form IC device 760. In some embodiments, the IC fabrication includes performing one or more lithographic exposures based at least indirectly on IC design layout diagram 722. Semiconductor wafer 753 includes a silicon substrate or other proper substrate having material layers formed thereon. Semiconductor wafer 753 further includes one or more of various doped regions, dielectric features, multi-level interconnects, and the like (formed at subsequent manufacturing steps).

Details regarding an integrated circuit (IC) manufacturing system (e.g., system 700 of FIG. 7), and an IC manufacturing flow associated therewith are found, e.g., in U.S. Pat. No. 9,256,709, granted Feb. 9, 2016, U.S. Pre-Grant Publication No. 20150278429, published Oct. 1, 2015, U.S. Pre-Grant Publication No. 20140040838, published Feb. 6, 2014, and U.S. Pat. No. 7,260,442, granted Aug. 21, 2007, the entireties of each of which are hereby incorporated by reference.

In some embodiments, a method executed at least partially by a processor comprises creating a plurality of groups of paths from a plurality of paths in an integrated circuit (IC) layout diagram. Each group among the plurality of groups has a unique dominant feature among a plurality of features of the plurality of paths. The dominant feature of a group among the plurality of groups is slack. The method further comprises testing at least one path in a group among the plurality of groups. The method also comprises, in response to the testing indicating that the at least one path fails, modifying at least one of the IC layout diagram, at least a portion of at least one library having cells included in the IC layout diagram, or a manufacturing process for manufacturing an IC corresponding to the IC layout diagram.

In some embodiments, a system comprises a processor. The processor is configured to extract a plurality of features of a plurality of paths in an integrated circuit (IC) layout diagram. The processor is further configured to create a plurality of groups of paths from the plurality of paths. Each group among the plurality of groups has a unique dominant feature among the plurality of features. The unique dominant feature is determined based on a calculated biasing of each feature among the plurality of features. The processor is further configured to perform a test of at least one path in at least one group among the plurality of groups. The processor is further configured to, in response to the test indicating that the at least one path fails, cause modification of at least one of the IC layout diagram, at least a portion of at least one library having cells included in the IC layout diagram, or a manufacturing process for manufacturing an IC corresponding to the IC layout diagram.

In some embodiments, a computer program product comprises a non-transitory, computer-readable medium containing instructions therein. The instructions, when executed by a processor, cause the processor to create a plurality of groups of paths from a plurality of paths in an integrated circuit (IC) layout diagram. Each group among the plurality of groups has a unique dominant feature among a plurality of features of the plurality of paths. The plurality of features comprises one or more timing features in a timing report of the IC layout diagram, one or more logical features in an IC schematic corresponding to the IC layout diagram, and one or more physical features of elements in the IC layout diagram. The instructions, when executed, further cause the processor to perform a test of at least one path in a group among the plurality of groups and, in response to the at least one path failing the test, cause modification of at least one of the IC layout diagram, at least a portion of at least one library having cells included in the IC layout diagram, or a manufacturing process for manufacturing an IC corresponding to the IC layout diagram.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. A method, said method executed at least partially by a processor and comprising:
    creating a plurality of groups of paths from a plurality of paths in an integrated circuit (IC) layout diagram, wherein
        each group among the plurality of groups has a unique dominant feature among a plurality of features of the plurality of paths, and
        the dominant feature of a group among the plurality of groups is slack;
    testing at least one path in a group among the plurality of groups; and
    in response to said testing indicating that the at least one path fails, modifying at least one of
        the IC layout diagram,
        at least a portion of at least one library having cells included in the IC layout diagram, or
        a manufacturing process for manufacturing an IC corresponding to the IC layout diagram.

2. The method of claim 1, wherein
said modifying changes not only the at least one path that fails said testing, but also other paths in the same group as the at least one path.

3. The method of claim 1, further comprising:
generating at least one test pattern for the at least one path in said group,
wherein said testing comprises testing the at least one path using the generated at least one test pattern.

4. The method of claim 1, wherein
the plurality of features comprises at least one of
    one or more timing features in a timing report of a static timing analysis (STA) of the IC layout diagram,
    one or more logical features in an IC schematic corresponding to the IC layout diagram, or
    one or more physical features of elements in the IC layout diagram.

5. The method of claim 1, further comprising:
removing at least one feature from the plurality of features to obtain a reduced set of features including the dominant features of the plurality of groups.

6. The method of claim 5, wherein
in said removing, the at least one removed feature comprises a feature which has no variation across the plurality of paths.

7. The method of claim 5, further comprising:
for each feature among the plurality of features, determining a correlation coefficient between
    values of said feature in the plurality of paths, and
    values of the slack in the plurality of paths,
wherein in said removing, the at least one removed feature comprises features with the correlation coefficients within a predetermined range.

8. The method of claim 7, wherein
the plurality of features comprises:
    numerical features having numerical values, and
    categorical features having non-numerical values,
the method further comprising:
    converting non-numerical values of the categorical features into converted numerical values;
    normalizing the numerical values of the numerical features and the converted numerical values of the categorical features; and
    using the normalized values to determine the correlation coefficient between the slack and each feature among the plurality of features.

9. The method of claim 8, wherein
the categorical features comprise:
    pin names or instance names which, in said converting, are converted into the corresponding converted numerical values based on hierarchy levels associated with the pin names or instance names,
    cell features which, in said converting, are split into cell function types and process parameters, and then the cell function types and the process parameters are converted into the corresponding converted numerical values, and other features which, in said converting, are converted into the corresponding converted numerical values using ordinal encoding.

10. The method of claim 1, wherein
said creating the plurality of groups comprises:
clustering the plurality of paths into a plurality of clusters,
determining the dominant feature for each cluster among the plurality of clusters, and
among the plurality of clusters,
designating each cluster having the dominant feature different from dominant features of other clusters as a group among the plurality of groups, and
merging clusters having the same dominant feature to obtain a further group among the plurality of groups.

11. The method of claim 10, wherein
said determining the dominant feature for each cluster among the plurality of clusters comprises
calculating $CB_{nx}=(CM_{nx}-DS_x)/DS_x$,
where
$CB_{nx}$ is a biasing of feature x in cluster n,
$CM_{nx}$ is a mean value of feature x in the paths in cluster n, and
$DS_x$ is a mean value of feature x in the plurality of paths, and
in response to $(CB_{nx}/\Sigma_{i=1}^{m} CB_n i)$ being greater than a predetermined threshold, determining that feature x is the dominant feature of cluster n, where the plurality of features includes m features.

12. The method of claim 11, wherein
said determining the dominant feature for each cluster among the plurality of clusters further comprises
in response to no cluster having $(CB_{nx}/\Sigma_{i=1}^{m} CB_n i)$ greater than the predetermined threshold, designating feature x as the dominant feature of the cluster with the greatest $(CB_{nx}/\Sigma_{i=1}^{m} CB_n i)$.

13. The method of claim 10, wherein
said clustering comprises K-means clustering.

14. A system, comprising a processor configured to:
extract a plurality of features of a plurality of paths in an integrated circuit (IC) layout diagram,
create a plurality of groups of paths from the plurality of paths, wherein each group among the plurality of groups has a unique dominant feature among the plurality of features, the unique dominant feature determined based on a calculated biasing of each feature among the plurality of features,
perform a test of at least one path in at least one group among the plurality of groups, and
in response to the test indicating that the at least one path fails, cause modification of at least one of
the IC layout diagram,
at least a portion of at least one library having cells included in the IC layout diagram, or
a manufacturing process for manufacturing an IC corresponding to the IC layout diagram.

15. The system of claim 14, wherein
the processor is configured to extract the plurality of features as
one or more timing features from a timing report of a static timing analysis (STA) of the IC layout diagram,
one or more logical features from an IC schematic corresponding to the IC layout diagram, and
one or more physical features of elements in the IC layout diagram.

16. The system of claim 14, wherein
the processor is configured to remove a feature which has no variation across the plurality of paths from the plurality of features.

17. The system of claim 14, wherein
the plurality of features comprises:
numerical features having numerical values, and
categorical features having non-numerical values,
the processor is further configured to
convert non-numerical values of the categorical features into converted numerical values,
normalize the numerical values of the numerical features and the converted numerical values of the categorical features,
use the normalized values to determine correlation coefficients between slack and the plurality of features, and
remove features with the correlation coefficients within a predetermined range from the plurality of features.

18. A computer program product, comprising a non-transitory, computer-readable medium containing instructions therein which, when executed by a processor, cause the processor to
create a plurality of groups of paths from a plurality of paths in an integrated circuit (IC) layout diagram, wherein each group among the plurality of groups has a unique dominant feature among a plurality of features of the plurality of paths, and the plurality of features comprises:
one or more timing features in a timing report of the IC layout diagram,
one or more logical features in an IC schematic corresponding to the IC layout diagram, and
one or more physical features of elements in the IC layout diagram,
perform a test of at least one path in a group among the plurality of groups; and
in response to the at least one path failing the test, cause modification of at least one of
the IC layout diagram,
at least a portion of at least one library having cells included in the IC layout diagram, or
a manufacturing process for manufacturing an IC corresponding to the IC layout diagram.

19. The computer program product of claim 18, wherein
the instructions, when executed by the processor, further cause the processor to
cluster the plurality of paths into a plurality of clusters, and
determine the dominant feature for each cluster among the plurality of clusters by
calculating $CB_{nx}=(CM_{nx}-DS_x)/DS_x$,
where
$CB_{nx}$ is a biasing of feature x in cluster n,
$CM_{nx}$ is a mean value of feature x in the paths in cluster n, and
$DS_x$ is a mean value of feature x in the plurality of paths, and
in response to $(CB_{nx}/\Sigma_{i=1}^{m} CB_n i)$ being greater than a predetermined threshold, determining that feature x is the dominant feature of cluster n, where the plurality of features includes m features, and
in response to no cluster having $(CB_{nx}/\Sigma_{i=1}^{m} CB_n i)$ greater than the predetermined threshold, designating feature x as the dominant feature of the cluster with the greatest $(CB_{nx}/\Sigma_{i=1}^{m} CB_n i)$.

20. The computer program product of claim 18, wherein the instructions, when executed by the processor, further cause the processor to
perform K-means clustering to cluster the plurality of paths into the plurality of clusters.

* * * * *